United States Patent
Salem et al.

(10) Patent No.: US 11,570,804 B2
(45) Date of Patent: Jan. 31, 2023

(54) RESOURCE ALLOCATION FOR TRANSMISSION WITH CONFIGURED GRANT IN UNLICENSED SPECTRUM

(71) Applicant: Huawei Technologies Co., Ltd., Shenzhen (CN)

(72) Inventors: Mohamed Adel Salem, Kanata (CA); Jiayin Zhang, Shanghai (CN); Liqing Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 213 days.

(21) Appl. No.: 17/000,131

(22) Filed: Aug. 21, 2020

(65) Prior Publication Data
US 2020/0389916 A1     Dec. 10, 2020

Related U.S. Application Data

(63) Continuation of application No. PCT/CN2019/106312, filed on Sep. 18, 2019.
(Continued)

(51) Int. Cl.
*H04W 72/14* (2009.01)
*H04L 41/0806* (2022.01)
(Continued)

(52) U.S. Cl.
CPC ......... *H04W 72/14* (2013.01); *H04L 41/0806* (2013.01); *H04W 72/042* (2013.01); *H04W 74/0833* (2013.01); *H04L 5/001* (2013.01); *H04W 72/0446* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 9,496,919 B2 * | 11/2016 | Rikkinen | H04W 16/14 |
| 9,743,432 B2 * | 8/2017 | Ji | H04L 5/0048 |

(Continued)

FOREIGN PATENT DOCUMENTS

| | | |
|---|---|---|
| CN | 106992847 A | 7/2017 |
| CN | 107889264 A | 4/2018 |

(Continued)

OTHER PUBLICATIONS

"3rd Generation Partnership Project; Technical Specification Group Radio Access Network; NR; Physical channels and modulation, (Release 15)", 3GPP TS 38.211 V15.3.0, Sep. 2018, 93 Pages.

(Continued)

*Primary Examiner* — Faiyazkhan Ghafoerkhan
(74) *Attorney, Agent, or Firm* — Slater Matsil, LLP

(57) ABSTRACT

Methods and devices are provided that enable configuration of a selected set of electronic devices (EDs) that are allocated the same time-domain resources and either orthogonal or the same frequency interlaces on a same unlicensed channel. Configuring the selected set of EDs in order to align transmission starting points in the unlicensed channel and utilizing blocking symbols for at least some of the transmission starting points, may mitigate mutual blocking during LBT procedures.

26 Claims, 8 Drawing Sheets

Related U.S. Application Data

(60) Provisional application No. 62/739,106, filed on Sep. 28, 2018.

(51) Int. Cl.
*H04W 72/04* (2009.01)
*H04W 74/08* (2009.01)
*H04L 5/00* (2006.01)

(56) References Cited

U.S. PATENT DOCUMENTS

| | | | | |
|---|---|---|---|---|
| 10,171,276 | B2* | 1/2019 | Stern-Berkowitz | ................. H04L 5/0048 |
| 10,716,142 | B2* | 7/2020 | Mukherjee | ........ H04W 72/1268 |
| 10,791,569 | B2 | 9/2020 | Salem et al. | |
| 10,813,129 | B2* | 10/2020 | Li | ................. H04L 5/0044 |
| 2015/0043456 | A1* | 2/2015 | Rikkinen | .............. H04W 16/14 370/329 |
| 2015/0085797 | A1* | 3/2015 | Ji | ................. H04L 5/0041 370/336 |
| 2017/0245302 | A1* | 8/2017 | Mukherjee | ............ H04W 16/14 |
| 2018/0048498 | A1* | 2/2018 | Stern-Berkowitz | ................. H04W 72/1215 |
| 2018/0049239 | A1* | 2/2018 | Tenny | ................. H04W 74/08 |
| 2018/0110071 | A1* | 4/2018 | Mukherjee | ........ H04W 74/0808 |
| 2018/0270839 | A1* | 9/2018 | Loehr | .............. H04W 72/14 |
| 2018/0288746 | A1* | 10/2018 | Zhang | ................. H04W 76/27 |
| 2018/0310308 | A1* | 10/2018 | Loehr | .............. H04W 72/1242 |
| 2018/0324852 | A1* | 11/2018 | Van Phan | ................. H04L 1/08 |
| 2018/0376493 | A1* | 12/2018 | Li | ................. H04W 72/042 |
| 2019/0029046 | A1* | 1/2019 | Li | ................. H04W 72/0446 |
| 2019/0159139 | A1* | 5/2019 | Yamada | .............. H04W 52/365 |
| 2019/0289628 | A1* | 9/2019 | Xiong | .............. H04W 72/0446 |
| 2019/0306924 | A1* | 10/2019 | Zhang | ................. H04L 5/0094 |
| 2019/0349974 | A1* | 11/2019 | Sundararajan | ........ H04W 72/14 |
| 2020/0052828 | A1* | 2/2020 | Wang | .............. H04W 72/0446 |
| 2020/0092044 | A1* | 3/2020 | Park | ................. H04L 1/189 |
| 2020/0205156 | A1* | 6/2020 | Adjakple | .......... H04W 72/0453 |
| 2020/0236689 | A1* | 7/2020 | Loehr | ................. H04L 5/0094 |
| 2020/0267744 | A1* | 8/2020 | Mu | ................. H04W 72/14 |
| 2020/0275431 | A1* | 8/2020 | Bae | ................. H04W 72/0413 |
| 2020/0296758 | A1* | 9/2020 | Li | ................. H04W 72/1289 |
| 2020/0367246 | A1* | 11/2020 | Loehr | ................. H04W 72/1289 |
| 2020/0389916 | A1* | 12/2020 | Salem | ................. H04L 5/0044 |
| 2020/0396724 | A1* | 12/2020 | Babaei | ................. H04W 72/042 |
| 2021/0091890 | A1* | 3/2021 | Ren | ................. H04W 72/042 |
| 2022/0295561 | A1* | 9/2022 | Wang | ................. H04W 72/0446 |

FOREIGN PATENT DOCUMENTS

| | | |
|---|---|---|
| RU | 2577481 C2 | 3/2016 |
| RU | 2665056 C1 | 8/2018 |
| WO | 2018093939 A1 | 5/2018 |
| WO | 2018173004 A1 | 9/2018 |

OTHER PUBLICATIONS

"3rd Generation Partnership Project; Technical Specification Group Radio Access Network; NR; Physical layer procedures for control, (Release 15)", 3GPP TS 38.213 V15.2.0 , Jun. 2018, 98 Pages.

"3rd Generation Partnership Project; Technical Specification Group Radio Access Network; NR; Physical layer procedures for data (Release 15)", 3GPP TS 38.214 V15.2.0, Jun. 2018, 94 Pages.

"3rd Generation Partnership Project; Technical Specification Group Radio Access Network; NR; Radio Resource Control (RRC) protocol specification (Release 15)", 3GPP TS 38.331 V15.3.0, Sep. 2018, 445 Pages.

Huawei, et al., "Transmission with configured grant in NR unlicensed band", 3GPP TSG RAN WG1 Meeting #94, R1-1808064, Aug. 20-24, 2018, 7 Pages, Gothenburg, Sweden.

Intel Corporation, "Summary of views on potential enhancements to configured grants", 3GPP TSG RAN WG1 Meeting #94, R1-1809825, Aug. 20-24, 2018, 12 Pages, Gothenburg, Sweden.

Intel Corporation, "Enhancements to NR configured grants for unlicensed operation", 3GPP TSG RAN WG1 Meeting #94, R1-1808688, Aug. 20-24, 2018, 4 Pages, Gothenburg, Sweden.

Vivo, "Discussion on the enhancements to configured grants", 3GPP TSG RAN WG1 Meeting #94, R1-1808240, Aug. 20-24, 2018, 4 Pages, Gothenburg, Sweden.

ZTE, "Discussion on configured grant for NR-U", 3GPP TSG RAN WG1 Meeting #94, R1-1808324, Aug. 20-24, 2018, 4 Pages, Gothenburg, Sweden.

3rd Generation Partnership Project; Technical Specification Group Radio Access Network; Physical layer procedures for shared spectrum channel access (Release 15), 3GPP TS 37.213, Jun. 2018, 20 Pages, V15.0.

"3rd Generation Partnership Project; Technical Specification Group Radio Access Network; NR; Medium Access Control (MAC) protocol specification (Release 15)," 3GPP TS 38.321 V15.2.0, Technical Specification, Jun. 2018, 73 Pages.

LG Electronics, "Physical layer design of UL signals and channels for NR unlicensed operation," 3GPP TSG RAN WG1 Meeting #94, R1-1808506, Aug. 20-24, 2018, Gothenburg, Sweden, 8 Pages.

* cited by examiner

RESOURCE ALLOCATION FOR TRANSMISSION WITH CONFIGURED GRANT IN UNLICENSED SPECTRUM

CROSS-REFERENCE TO RELATED APPLICATIONS

This application is a continuation of PCT Application No. PCT/CN2019/106312 filed on Sep. 18, 2019 and entitled "Resource Allocation for Transmission with Configured Grant in Unlicensed Spectrum," which claims the benefit of priority of U.S. Provisional Patent Application 62/739,106 filed on Sep. 28, 2018 and entitled "Resource Allocation for Transmission with Configured Grant in Unlicensed Spectrum," all of which applications are hereby incorporated by reference herein in their entireties.

TECHNICAL FIELD

The present disclosure relates generally to wireless communications, and in particular embodiments, to configured grant (CG) uplink transmissions in unlicensed spectrum.

BACKGROUND

In wireless communication systems, an electronic device (ED), such as a user equipment (UE), wirelessly communicates with a Transmission and Receive Point (TRP), termed "base station", to send data to the ED and/or receive data from the ED. A wireless communication from an ED to a base station is referred to as an uplink communication. A wireless communication from a base station to an ED is referred to as a downlink communication.

Resources are required to perform uplink and downlink communications. For example, an ED may wirelessly transmit data to a base station in an uplink transmission at a particular frequency and during a particular time slot. The frequency and time slot used is an example of a physical communication resource.

In an LTE grant-based transmission, the required transmission control parameters are typically communicated via a Physical Uplink Control Channel (PUCCH) and/or Physical Downlink Control Channel (PDCCH). The base station is aware of the identity of the ED sending the uplink transmission using the granted uplink resources, because the base station specifically granted those uplink resources to that ED. In a configured grant transmission, different EDs may send uplink transmissions using uplink resources shared by the EDs, without specifically requesting use of the resources and without specifically being granted the resources by the base station. One advantage of configured grant transmission is low latency resulting from not having to request and receive a grant for an allocated time or frequency resource from the base station. Furthermore, in a configured grant transmission, the scheduling overhead may be reduced. However, the base station does not have information which ED, if any, is sending a configured grant uplink transmission at a particular moment of time, which may require blind detection of configured grant transmissions received at the base station. In other words, the base station is required to determine which ED is transmitting. Therefore, the BS can use the combination of uplink reference symbols (RS) and occupied time-frequency resources to identify a configured grant ED as well as the transport block being received from that configured grant ED.

Some modes of communication may enable communications with an ED over an unlicensed spectrum band, or over different spectrum bands (e.g., an unlicensed spectrum band and/or a licensed spectrum band) of a wireless network. Given the scarcity and expense of bandwidth in the licensed spectrum, exploiting the vast and free-of-charge unlicensed spectrum to offload at least some communication traffic is an approach that has garnered interest from mobile broadband (MBB) network operators. For example, in some cases uplink transmissions may be transmitted over an unlicensed spectrum band. Accordingly, efficient and fair mechanisms for configured grant uplink transmissions in the unlicensed spectrum may be desirable.

SUMMARY

According to an aspect of the application, there is provided a method for an electronic device (ED) in a wireless communication network, the method involves receiving, at the ED from a base station, configured grant (CG) resource configuration information to configure the ED for CG uplink transmission in unlicensed spectrum, the CG resource configuration information includes: an indication of a CG time domain resource duration within a period of a CG time domain resource; and an indication of a periodicity of the CG time domain resource; and transmitting the CG uplink transmission over the unlicensed spectrum in accordance with the CG resource configuration information.

In some embodiments, the CG resource configuration information further includes CG time domain resource allocation information, wherein the time domain resource allocation information identifies multiple occasions for the ED to start a CG uplink transmission within the CG time domain resource duration upon a successful listen-before-talk (LBT) procedure.

In some embodiments, the indication of the CG time domain resource duration comprises an indication of a size of the CG time domain resource within the period containing the CG time domain resource.

In some embodiments, the indication of the size of the CG time domain resource is one of: an index associated with a size of a CG time domain resource selected from a set of sizes of CG time domain resources; or an indication of an absolute size of the CG time domain resource.

In some embodiments, the CG time domain resource allocation information includes: an indication of a number of start positions for a transmission within the CG time domain resource; one of: an indication of a number of blanking positions within the CG time domain resource; or an indication of a time interval between blanking positions from a beginning of the CG time domain resource; and for each of the blanking positions, one of: an indication of a starting point for the transmission at the blanking position; or an indication of a number of blanking symbols from the blanking position.

In some embodiments, all the CG resource configuration information is received in radio resource control (RRC) signaling.

In some embodiments, the CG resource configuration information is received in part in radio resource control (RRC) signalling and in part in downlink control information (DCI) signalling.

In some embodiments, the indication of the CG time domain resource duration and the indication of the periodicity of the CG time domain resource are received in radio resource control (RRC) signaling and the time domain resource allocation information is received in downlink control information (DCI) signaling.

In some embodiments, the CG resource configuration information is selected to align a blanking position at a beginning of a transmission start position for the ED to mitigate mutual blocking between the ED and other EDs during LBT procedures performed by the other EDs.

In some embodiments, the method further involves selecting the CG resource configuration information to align a transmission starting positon of the ED with a transmission starting positon of other EDs to allow frequency multiplexing of the ED and other EDs configured to use orthogonal frequency interlaces.

In some embodiments, the method further involves the ED receiving an indication of a frequency domain resource comprising an identification of a plurality of subbands within a wideband carrier and one or more frequency interlaces that are configured for the CG uplink transmission in the unlicensed spectrum; and the ED performing the LBT procedure for at least one of the plurality of subbands.

In some embodiments, the number of subbands in the plurality of subbands is based on one of a traffic type of the transmission or a transmission block (TB) size of the transmission.

In some embodiments, the method further involves the ED receiving an indication of one or more frequency interlaces per subband for the plurality of subbands for the CG uplink transmission in the unlicensed spectrum, wherein the one or more frequency interlaces per subband configured for the ED are different than one or more frequency interlaces per subband configured for other EDs that the base station serves.

According to an aspect of the application, there is provided a method for a base station in a wireless communication network, the method involves: transmitting, by the base station to an electronic device (ED), configured grant (CG) resource configuration information to configure the ED for CG uplink transmission in unlicensed spectrum, the CG resource configuration information includes: an indication of a CG time domain resource duration within a period of a CG time domain resource; an indication of a periodicity of the CG time domain resource; and receiving the CG uplink transmission over the unlicensed spectrum in accordance with the CG resource configuration information.

In some embodiments, the CG resource configuration information further includes time domain resource allocation information, wherein the time domain resource allocation information identifies multiple occasions for the UE to start a CG uplink transmission within the CG time domain resource duration upon a successful listen-before-talk (LBT) procedure;

In some embodiments, the indication of the CG time domain resource duration includes an indication of a size of the CG time domain resource within a period containing the CG time domain resource.

In some embodiments, the indication of the size of the CG time domain resource is one of: an index associated with a size of a CG time domain resource selected from a set of sizes of CG time domain resources; or an indication of an absolute size of the CG time domain resource.

In some embodiments, the time domain allocation information includes: an indication of a number of start positions for data transmission within the CG time domain resource; one of: an indication of a number of blanking positions within the CG time domain resource; or an indication of a time interval between blanking positions from a beginning of the CG time domain resource; and for each of the blanking positions, one of: an indication of a starting point for the transmission at the blanking position; or an indication of a number of blanking symbols from the blanking position.

In some embodiments, all the CG resource configuration information is transmitted in radio resource control (RRC) signaling.

In some embodiments, the CG resource configuration information is received in part in radio resource control (RRC) signalling and in part in downlink control information (DCI) signalling.

In some embodiments, the indication of the CG time domain resource duration and the indication of the periodicity of the CG time domain resource are transmitted in radio resource control (RRC) signaling and the time domain resource allocation information is received in downlink control information (DCI) signaling.

In some embodiments, the CG resource configuration information is selected to align a blanking position at a beginning of a transmission start position for the ED to mitigate mutual blocking between the ED and other EDs during LBT procedures performed by the other EDs.

In some embodiments, selecting the CG resource configuration information to align a transmission starting positon of the ED with a transmission starting positon of other EDs to allow frequency multiplexing of the ED and other EDs configured to use orthogonal frequency interlaces.

In some embodiments, the method further involves the base station transmitting an indication of a frequency domain resource including an identification of a plurality of subbands within a wideband carrier and one or more frequency interlaces that are configured for the CG uplink transmission in the unlicensed spectrum.

In some embodiments, the method further involves the base station transmitting an indication of one or more frequency interlaces per subband for the plurality of subbands for the CG uplink transmission in the unlicensed spectrum for each ED served by the base station, wherein the one or more frequency interlaces per subband configured for each ED are different than other EDs.

According to an aspect of the application, there is provided a method for an electronic device (ED) in a wireless communication network, the method involving: transmitting, by the ED, configured grant (CG) resource configuration information to configure a base station for CG uplink transmission in unlicensed spectrum, the CG resource configuration information including, for each physical uplink shared channel (PUSCH) being transmitted, uplink control information (UCI) that includes an indication of a PUSCH start point, and an indication of a PUSCH end point.

In some embodiments, the indication of the PUSCH start point comprises at least one of: an indication of the PUSCH start point that is one or more orthogonal frequency domain multiplexed (OFDM) symbols; and an indication of the PUSCH start point that is a fixed mapping to a number of OFDM symbols based on subcarrier spacing configuration.

In some embodiments, the method further involves when preconfigured blanking symbol locations overlap with symbol locations preceding the PUSCH start point from the end of the last slot boundary or symbol locations following the PUSCH end point to the start point of a next slot boundary, selecting by the UE the PUSCH start point to be a symbol location subsequent to the preconfigured blanking symbols and the PUSCH end point to be a symbol location prior to the start of a next slot or a next preconfigured blanking symbol.

According to an aspect of the application, there is provided a method in a wireless communication network, the method involving: receiving, by a base station from an electronic device (ED), configured grant (CG) resource configuration information to configure the base station for CG uplink transmission in unlicensed spectrum, the CG resource configuration information comprising, for each physical uplink shared channel (PUSCH) being transmitted, uplink control information (UCI) that includes an indication of a PUSCH start point, and an indication of a PUSCH end point.

In some embodiments, the indication of the PUSCH start point comprises at least one of: an indication of the PUSCH start point that is one or more orthogonal frequency domain multiplexed (OFDM) symbols; and an indication of the PUSCH start point that is a fixed mapping to a number of OFDM symbols based on subcarrier spacing configuration.

In some embodiments, the method further involves receiving an indication of the selected PUSCH start point and the selected PUSCH end point, wherein the PUSCH start point is a symbol location subsequent to the preconfigured blanking symbols and the PUSCH end point is a symbol location prior to the start of a next slot or a next preconfigured blanking symbol.

When preconfigured blanking symbol locations overlap with symbol locations preceding the PUSCH start point from the end of the last slot boundary or symbol locations following the PUSCH start point to the start point of a next slot boundary, the pre-configured blanking overrides (or may be fulfilled by) the UE-selection of OUSCH start and ending positions.

BRIEF DESCRIPTION OF THE DRAWINGS

Embodiments of the present disclosure will be described in greater detail with reference to the accompanying drawings.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of this disclosure provide a configured grant transmission mode for uplink transmissions in unlicensed spectrum in a wireless network. In this disclosure, configured grant transmissions refer to transmissions that are performed without communicating grant-based signaling. The configured grant uplink transmission may be a burst transmission. The transmission may include, but is not limited to, one or more physical uplink shared channel (PUSCH), uplink control information (UCI) on a PUSCH, or a demodulation reference signal (DM-RS).

Turning now to the figures, some specific example embodiments will be described.

Communication System

Figure 1:
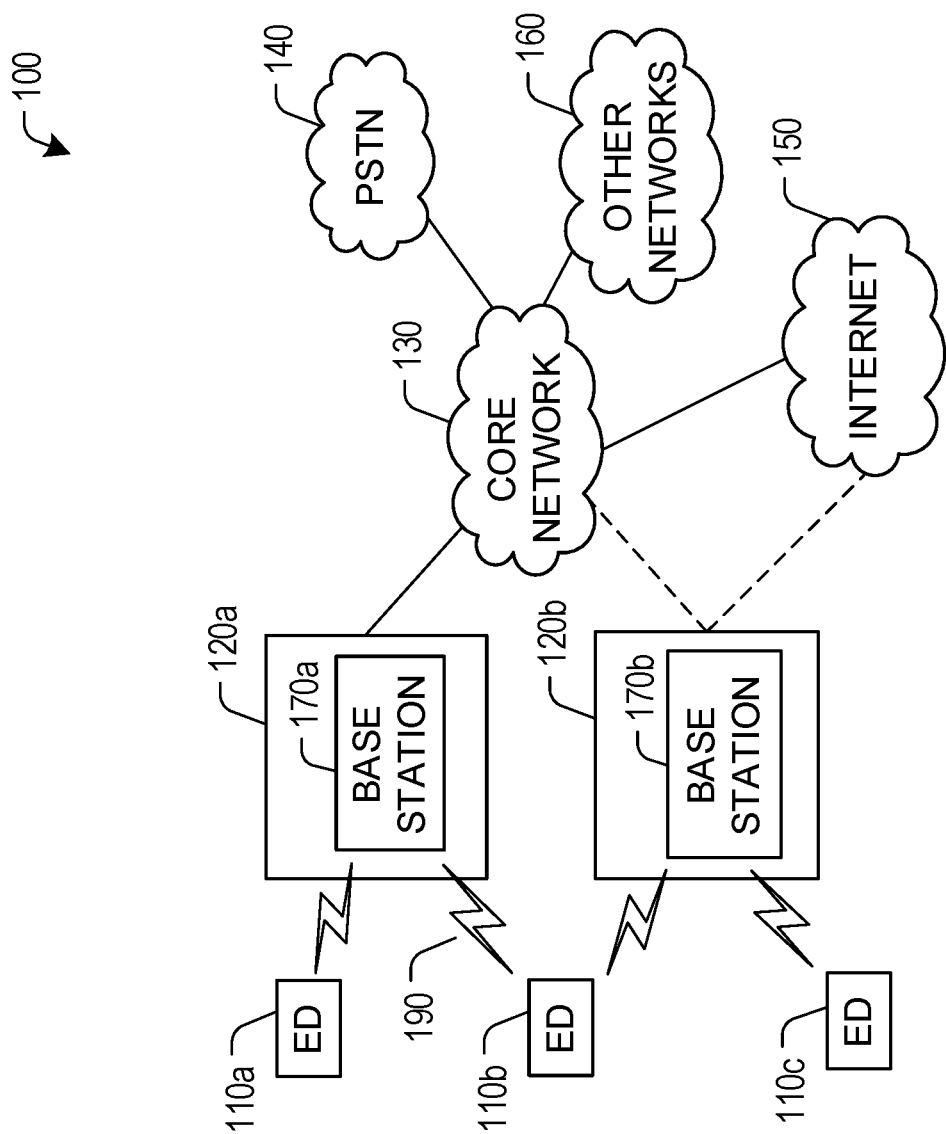
FIG. 1 is a schematic diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 100a-100c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The radio communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Uplink Packet Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support such.

Figure 2A:
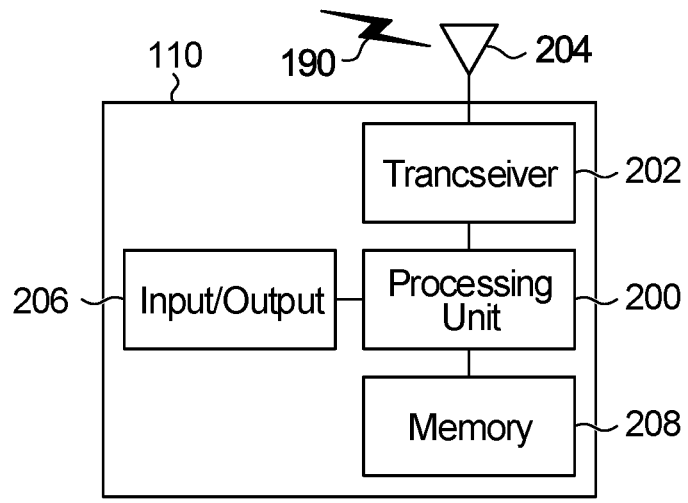
FIGS. 2A and 2B are block diagrams of an example ED and base station, respectively.
Figure 2B:
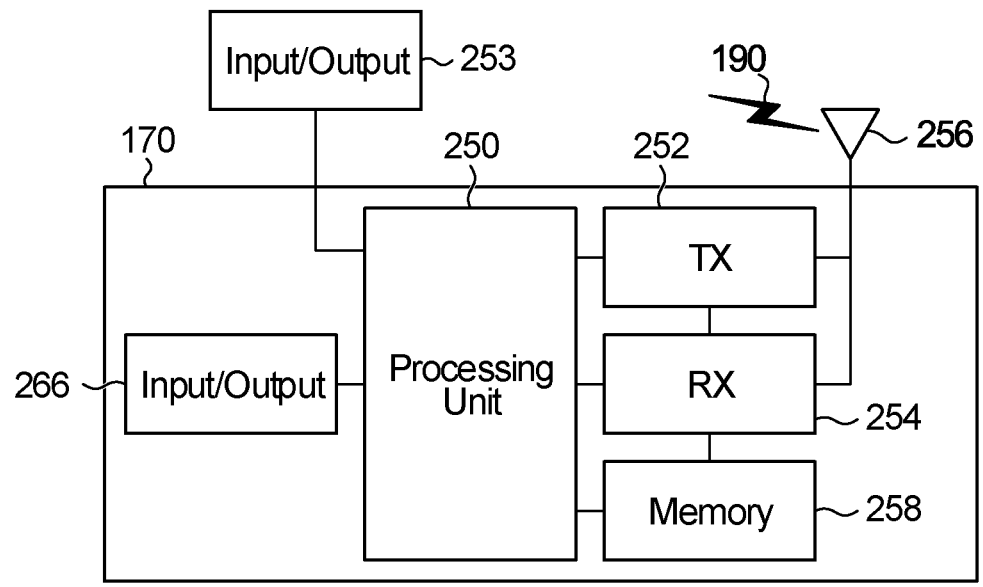

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 1400. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 1402 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Configured Grant Transmissions

The base stations 170 are configured to support wireless communication with EDs 110, which may each send configured grant uplink transmissions. Uplink transmissions from the EDs 110 are performed on a set of time-frequency resources. A configured grant uplink transmission is an uplink transmission that is sent using uplink resources without the base stations 170 dynamically allocating resources to request/grant mechanisms. By performing configured grant transmissions, total network overhead resources may be saved. Furthermore, time savings may be provided by bypassing the request/grant procedure. An ED sending a configured grant uplink transmission, or configured to send a configured grant uplink transmission, may be referred to as operating in configured grant mode. Configured grant uplink transmissions are sometimes called "grant-free", "grant-less", "schedule free", or "schedule-less" transmissions. Configured grant uplink transmissions from different EDs may be transmitted using shared designated resource units, in which case the configured grant uplink transmissions are contention-based transmissions. One or more base stations 170 may perform blind detection of the configured grant uplink transmissions.

In a wireless network according to an embodiment, any ED can be configured for grant-based or configured grant transmissions depending on, e.g., the application and device types and requirements. Usually, a configured grant transmission may require resource (pre-) configuration at the ED connection setup and have resource reconfiguration or an update during operation. In some embodiments, the configured grant resources can be configured for EDs by UE-specific signaling, or broadcast or multi-cast signaling in some scenarios. Two or more configured grant transmissions can share the same configured resources. Furthermore, in some embodiments, a grant-based transmission can use dedicated resources or can share resources (fully or partially) with configured grant resources in a time interval.

Any of the configured grant and grant-based transmissions can be used for any application traffic or services type, depending on the associated application requirements and quality of service (QoS). By way of a non-limiting example, configured grant transmission can be used for: ultra-reliable low latency communication (URLLC) traffic to satisfy the low latency requirement; enhanced mobile broadband (eMBB) traffic with short packets to save signaling overhead; and eMBB traffic to dynamically take advantage of link adaptation and enhance resource utilization and spectrum efficiency. The present application pertains in particular to using configured grant in unlicensed spectrum to overcome the listen-before-talk (LBT) overhead and potential LBT failure for scheduled uplink procedure. Aspects of the present application may mitigate excess latency and may improve the spectrum efficiency.

One ED or a group of EDs may have a group ID or Radio Network Temporary ID (RNTI; e.g., configured grant (CG)-RNTI or grant-based (GB) RNTI) to share the same parameter or resource configuration. The group ID can be pre-configured, or dynamically configured to each ED. The parameter or resource configuration to the ED(s) with the group ID can be done by semi-static or dynamic signaling. In some embodiments, the group ID can be used for, e.g., resource deactivation or activation for the EDs in the group. In some embodiments, for New Radio Configured Grant (NR CG) and Further Enhanced Licensed-Assisted Access (FeLAA) autonomous uplink (AUL), activation and deactivation can be performed through UE-specific downlink control information (DCI), By way of a non-limiting example, the resources being activated or deactivated can include frequency, time, and reference signal (RS) associated with each ED in the group.

Configured grant transmission eliminates the latency and control overhead associated with the scheduling request/grant procedure of grant-based transmission and can allow for more transmission repetitions to increase the likelihood of successful detection or achieve a desired reliability.

For reasons such as the foregoing, uplink configured grant transmission has been agreed to be supported in the 3GPP study item for the 5G New Radio (NR) air interface.

However, for EDs experiencing bad channel conditions and/or persistent resource collisions, switching a transport block (TB) to contention-free grant-based transmission is often desired to ensure successful decoding and/or to exploit link adaptation of uplink scheduling by the base station compared to the pre-configured transport formats used in configured grant transmission.

Configured Grant Resource Structure

To support configured grant transmissions in NR licensed band, the associated resources configured for an ED or a group of EDs can include any or all of the following:

1) Frequency resources in a transmission time interval (TTI), e.g. a symbol, mini-slot or slot. In one example, a physical resource block (PRB) scheme is provided. The PRB scheme indicates physical starting frequency resource block (RB) and size of the RBs allocated.

2) Time resources, including starting/ending position of one data transmission time interval. For example, TTI can be one symbol, mini-slot, or slot.

3) Reference signal (RS) or RS configuration, where each ED can be configured with one or more reference signals (RSs) e.g. demodulation reference signals (DMRSs) depending on scenarios involved. For a group of EDs, each ED may or may not have a different RS or have a different set of RSs. Note that different RSs can be orthogonal or non-orthogonal to each other depending on an application, e.g., such as URLLC application or massive machine-type communication (mMTC) application.

4) ED/ED group specific hopping parameters, which may include one of the following two parameters. One parameter may include a hopping pattern cycle period. In one embodiment, an absolute reference duration (e.g., 20 TTI before repeating itself) is defined. During the absolute reference duration, the number of hopping steps (e.g., 10 times) to take before repeating the hopping pattern again can be determined based on periodicity of time interval resource accessible for configured grant transmissions (e.g., 2 TTI). In another embodiment, an absolute number of hopping times can be defined, for example hopping 20 times before repeating itself. Other parameter(s) may include a hopping pattern index or indices, where one ED may have one or more hopping pattern indices.

5) One or more hybrid automatic repeat request (HARQ) process IDs per ED.

6) One or more MCSs per ED, where a configured grant ED can indicate explicitly or implicitly which MCS to use for a transmission.

7) Number of configured grant transmission repetitions K, one or more K values can be configured for an ED, where which K value to use depends on certain rule taking into account ED channel conditions, service types, etc.

8) Power control parameters, including power ramping step size (e.g., for an ED).

9) Other parameters, including information associated with general grant-based data and control transmissions. Note that sometimes, a subset of configured grant resources can be referred to as "fixed" or "reserved" resources; whereas a subset of grant-based resources can be referred to as "flexible" resources, which can be dynamically scheduled by a base station.

Hybrid Automatic Repeat Request

As discussed above, the ED 110 may be configured to use a particular set of resources for configured grant transmission. A collision may occur when two or more of the EDs 110 attempt to transmit data on a same set of uplink resources. To mitigate possible collisions, the EDs 110 may use retransmissions. A retransmission, without grant, of an original configured grant uplink transmission is referred to herein as a "configured grant retransmission". Any discussion of a configured grant retransmission herein should be understood to refer to either a first or a subsequent retransmission. Herein, the term "retransmission" includes both simple repetitions of the transmitted data, as well as retransmissions using an asynchronous hybrid automatic repeat request (HARQ), that is, a combination of high-rate forward error-correcting coding and physical layer automatic repeat request (ARQ) error control.

In licensed band NR, a number of automatic configured grant retransmissions may be pre-configured, to improve reliability and eliminate latency associated with waiting for an acknowledgement (ACK) or a negative acknowledgement (NACK) message. The retransmissions may be performed by the ED 110 until at least one of the following conditions is met:

(1) An ACK message is received from the base station 170 indicating that the base station 170 has successfully received and decoded the TB. The ACK may be sent in a dedicated downlink acknowledgement channel, sent as individual Downlink Control Information (DCI), sent in a data channel, sent as part of a group ACK/NACK, etc.

(2) The number of repetitions reaches K. In other words, if the ED 110 has performed K retransmissions and an ACK is still not received from the base station 170, then the ED 110 gives up trying to send the data to the base station 170. In some embodiments, K is semi-statically configured by the base station 170, such that the base station 170 or the network can adjust K over time.

(3) A grant is received from the base station 170 performing a configured grant to grant-based switch.

In an embodiment, the configured grant retransmission may be triggered by receiving a negative acknowledgment (NACK) message, or failing to receive an acknowledgment (ACK) message. In an alternative embodiment, K configured grant retransmissions are performed irrespective of the response from the base station 170.

The resources over which the one or more configured grant retransmissions are performed may be pre-configured, in which case the base station determines the resources based on a priori information. Alternatively, the resources over which the configured grant initial transmission or one or more retransmissions are performed may be determined e.g. according to an identifier in a pilot signal of the original configured grant uplink transmission. This may allow the base station to predict, or otherwise identify, which uplink resources will carry the one or more retransmissions upon detecting the identifier in the pilot symbol.

Configured grant transmission reduces latency and control overhead associated with grant-based procedures, and can allow for more retransmissions/repetitions to increase reliability. However, due to the lack of uplink scheduling and grant signaling, configured grant EDs may have to be pre-configured to use a fixed modulation and coding scheme (MCS) level at least for initial configured grant transmission. In one embodiment, configured grant EDs are configured to use the most reliable MCS level for a given resource unit for configured grant uplink transmissions.

Unlicensed Spectrum Access

As noted above, given the scarcity and expense of bandwidth in the licensed spectrum, and the increasing demand for data transmission capacity, there is increasing interest in offloading at least some communication traffic, such as uplink communication traffic, to the unlicensed spectrum. For example, there has been significant interest in the unlicensed 5 GHz spectrum in which many Wireless Local Area Networks (WLANs) operate. Accordingly, in order to operate in this spectrum, efficient and fair coexistence with WLANs along with compliance with region-specific unlicensed spectrum regulations may be necessary.

Licensed-Assisted Access (LAA) and enhanced LAA (eLAA) of 3GPP Rel 13 and Rel 14, respectively, are aimed at porting the spectral-efficient MBB air interface (AI) to the vast and free-of-charge unlicensed spectrum through aggregating unlicensed component carriers (CCs) at the operator's small cells with the assistance of the anchor licensed carriers.

However, UL transmission in eLAA has been built around the GB scheme only. To present a global unlicensed solution, regulatory requirements such as Listen-Before-Talk (LBT) have to be imposed on the medium access design. As such, UL transmission in eLAA has been disadvantaged in terms of latency and successful medium access opportunities due to the multiple contention levels for:

ED to transmit the scheduling request (SR) e.g., in stand-alone (SA) deployments, i.e., without an anchor licensed cell.

Base station to schedule the ED among other EDs

Base station to transmit the scheduled grant (especially for self-carrier scheduling)

ED to pursue the GB transmission.

Aspects of the present disclosure address the challenges of uplink transmission in the unlicensed spectrum by enabling a CG transmission scheme as part of the unified NR-U air interface.

Before an ED can access unlicensed spectrum to transmit on an unlicensed spectrum sub-band, the ED performs a listen-before talk (LBT) operation (for example including initial clear channel assessment (ICCA) and an extended clear channel assessment (ECCA)) in order to check that the channel is idle before transmitting. A sub-band of an unlicensed spectrum band may include a group of frequency resources that comprises one or more unlicensed channels as defined by the IEEE 802.11 standard in the geographical region of operation, or one or more bandwidth parts (BWPs) as defined by wireless communication standards, for example.

In regions such as Europe and Japan, devices attempting to access the unlicensed spectrum have to comply with either a Load Based Equipment (LBE) LBT procedure or a Frame Based Equipment (FBE) LBT procedure.

In the LBE LBT procedure, a device attempting to access the unlicensed spectrum can start transmitting after a successful CCA. The CCA mechanism employed in such LBE LBT procedures may be the same CCA mechanism employed in WLAN, i.e. carrier sense multiple access with collision avoidance (CSMA/CA), or it may be based on an energy-detection-based CCA. For example, an energy-detection-based CCA may utilize a random back-off to determine the size of a contention window and a respective maximum channel occupancy time (MCOT) that determines the maximum amount of time that a device may transmit in the unlicensed spectrum once it has successfully contended for a transmission resource.

In FBE LBT procedures, a device attempting to access the unlicensed spectrum can start transmitting only at periodic instants after a short successful energy-detection-based CCA.

The 3rd Generation Partnership Project (3GPP) Release 13 Long Term Evolution (LTE) specification provides a framework for Licensed Assisted Access (LAA) in unlicensed spectrum. The framework includes a Category 4 (CAT4) LBT procedure (LBT with random back-off or ECCA) that each device attempting to access the unlicensed spectrum must comply with. Similar to the LBT mechanism in CSMA/CA for WIFI/WLAN, in the 3GPP Release 13 CAT4 LBT mechanism each device independently generates a random back-off counter or contention window (CW), and if a CCA is terminated due to a 'busy' assessment, the back-off counter is frozen to maintain priority in the next access attempt. However, synchronous group access of neighboring small cell evolved Node Bs (eNBs) is supported in 3GPP Release 13 via backhaul connections by setting a common starting time for downlink (DL) transmissions from neighboring small cell eNBs. An eNB that finishes a successful CCA before the preset subframe starting point has to defer its transmission to that point. However, an eNB that has deferred its transmission cannot prevent WiFi or other LAA access during the defer time by transmitting a blank blocking/reservation signal because this will likely cause the ongoing CCAs of in-group eNBs to fail.

Configured Grant UL Transmission in Unlicensed Spectrum

Methods and devices are provided that address the above challenges associated with supporting configured grant uplink transmission in unlicensed spectrum. In some embodiments, EDs in the same group are configured to align their transmission starting times following the success of respective LBT CCA procedures in order to access the unlicensed spectrum simultaneously and share time-frequency resources of an unlicensed spectrum sub-band for configured grant uplink transmissions.

The configuration or re-configuration can be done through DL RRC signaling and a combination of RRC signaling and downlink control information (DCI) activation.

In some embodiments of the present disclosure, a group of EDs are configured to align their transmission starting times to a common configured grant transmission cycle characterized by a configured grant transmission cycle reference time and a configured grant transmission cycle period. EDs configured with the same configured grant transmission cycle may be grouped into the same unlicensed spectrum sub-band. An unlicensed spectrum sub-band may include one or more BWPs or one or more unlicensed spectrum channels, e.g. with a bandwidth of 20/40/80/100/ 160 MHz.

Sub-band time-frequency resources are shared by the group EDs for their respective grant-free uplink transmissions within the sub-band, but because the transmission starting points are aligned in time, the group EDs do not block each other during the CCA procedure.

A numerology is defined as the set of physical layer parameters of the air interface that are used to communicate a particular signal. For OFDM-based communication, a numerology is described in terms of at least subcarrier spacing (SCS) and OFDM symbol duration, and may also be defined by other parameters such as fast Fourier transform (FFT)/inverse FFT (IFFT) length, transmission time slot length, and cyclic prefix (CP) length or duration. As will be discussed in further detail later on, the numerologies used for configured grant UL transmissions in the unlicensed spectrum in accordance with the present disclosure may be selected so as to support certain functionality.

Configured Grant Transmission Cycle Numerology

An aligned configured grant transmission cycle used by a group of configured grant EDs for a given unlicensed spectrum sub-band can be asynchronous with respect to the aligned configured grant transmission cycles used for other unlicensed spectrum sub-band(s). The respective numerologies and Alignment Time Unit (ATUs) used in different unlicensed spectrum sub-bands may also be different. Examples of ATUs include, but are not limited to, slot, mini-slot and symbol.

Frame structures have been proposed that are flexible in terms of the use of differing numerologies. As previously noted, a numerology is defined as the set of physical layer parameters of the air interface that are used to communicate a particular signal. A numerology is described in terms of at least subcarrier spacing (SCS) and OFDM symbol duration, and may also be defined by other parameters such as fast Fourier transform (FFT)/inverse FFT (IFFT) length, transmission time slot length, and cyclic prefix (CP) length or duration. In some implementations, the definition of the numerology may also include which one of several candidate waveforms is used to communicate the signal. Possible waveform candidates may include, but are not limited to, one or more orthogonal or non-orthogonal waveforms selected from the following: Orthogonal Frequency Division Multiplexing (OFDM), Filtered OFDM (f-OFDM), Filter Bank Multicarrier (FBMC), Universal Filtered Multicarrier (UFMC), Generalized Frequency Division Multiplexing (GFDM), Single Carrier Frequency Division Multiple Access (SC-FDMA), Low Density Signature Multicarrier Code Division Multiple Access (LDS-MC-CDMA), Wavelet Packet Modulation (WPM), Faster Than Nyquist (FTN) Waveform, low Peak to Average Power Ratio Waveform (low PAPR WF), Pattern Division Multiple Access (PDMA), Lattice Partition Multiple Access (LPMA), Resource Spread Multiple Access (RSMA), and Sparse Code Multiple Access (SCMA).

These numerologies may be scalable in the sense that subcarrier spacings of different numerologies are integer multiples of each other, and time slot lengths of different numerologies are also integer multiples of each other. Such a scalable design across multiple numerologies provides implementation benefits, for example scalable total OFDM symbol duration in a time division duplex (TDD) context.

When multiple EDs share a frequency resource, each ED can use one or more frequency interlaces when transmitting their respective configured grant UL bursts. Therefore in some embodiments, different EDs each use a respective set of orthogonal frequency interlaces to transmit their respective configured grant UL bursts within the unlicensed sub-band.

One type of transmission with configured grant (TCG) that is being contemplated for NR, referred to as Type 1 NR TCG, includes using radio resource control (RRC) signaling to provide configuration information to an ED. Examples of configuration information include, but are not limited to, periodicity, offset, time-frequency allocation, ED-specific demodulation reference signals (DMRS) configuration, modulation coding scheme/transmit block size (MCS/TBS), number of repetitions (K) and power control.

In a second type, referred to as Type 2 NR TCG, RRC signaling can be used to provide an ED some of the configuration information and other configuration information is provided to the ED in activation downlink control information (DCI). Examples of the configuration information that might be provided in RRC signaling includes, but are not limited to, periodicity, power control, number of repetitions (K), and MCS/TBS. Examples of configuration information that may be provided in the activation DCI includes, but are not limited to, offset, time-frequency allocation, MCS/TBS and ED-specific DMRS configuration information.

With regard to time-domain resource allocation for the configured grant transmission in unlicensed spectrum, the following two parameters are configured through RRC signalling for both Type 1 and Type 2 identified above.

K-repetitions: K={1, 2, 4, 8} consecutive transmissions of the same PUSCH.

Periodicity: The following periodicities are supported depending on the configured subcarrier spacing:

15 kHz: 2, 7, n*14, where n={1, 2, 4, 5, 8, 10, 16, 20, 32, 40, 64, 80, 128, 160, 320, 640}

30 kHz: 2, 7, n*14, where n={1, 2, 4, 5, 8, 10, 16, 20, 32, 40, 64, 80, 128, 160, 256, 320, 640, 1280}

60 kHz with normal CP: 2, 7, n*14, where n={1, 2, 4, 5, 8, 10, 16, 20, 32, 40, 64, 80, 128, 160, 256, 320, 512, 640, 1280, 2560}

60 kHz with ECP: 2, 6, n*12, where n={1, 2, 4, 5, 8, 10, 16, 20, 32, 40, 64, 80, 128, 160, 256, 320, 512, 640, 1280, 2560}.

The following two parameters are configured via RRC for Type 1 and via activation DCI for Type 2:

timeDomainAllocation: Allocation of configured uplink grant in time domain which indicates a table entry containing startSymbolAndLength; and timeDomainOffset: Offset of a resource with respect to SFN=0 in time domain for Type 1 and with respect to the transmission time of the activation DCI for Type 2. As such, for both Type 1 and Type 2, the timeDomainOffset along with the Periodicity define the beginning of each period at which the configured time resource starts.

There are several potential problems with the existing Type 1 and Type 2 procedures for transmission configured grant if they were to be applied to operation in unlicensed spectrum.

In the case of Type 1 and Type 2 procedures, for a configured grant capable ED that has a transmission ready to transmit, the ED may not be able to gain access to a pre-configured resources as a result of an LBT failure. The transmission may be a burst transmission. The transmission may include, but is not limited to, one or more physical uplink shared channel (PUSCH), uplink control information (UCI) on a PUSCH, or a demodulation reference signal (DM-RS). If such a LBT failure occurs, the ED would have to defer channel access until the next configured grant period. A K-repetition configuration is not useful in such case. If the first transmission misses a first slot, a retransmission may not be able to start at a subsequent slot over which the remaining of K repetitions are configured. The existing Type 1 and Type 2 procedures involve configuring a start location and a length of a pre-configured grant opportunity that is applied to every grant free slot. Such a procedure may be too restrictive if gaps within burst transmission are to be avoided The procedure may be too restrictive because any configuration that has a starting symbol other than a first orthogonal frequency domain multiplexed (OFDM) symbol (OS #0, when there are 14 OFDM symbols in a slot) and/or a PUSCH length that does not end at a last OFDM symbol (OS #13) may result in gaps between the slots of the CG time resource. Depending on subcarrier spacing, such gaps can be sufficient for other nodes to acquire the channel.

Embodiments of the present application may enable configuration of a selected set of EDs that are allocated the same time-domain resources and either orthogonal or the same frequency interlaces on a same unlicensed channel. Configuring the selected set of EDs in order to align transmission starting points in the unlicensed channel and, in some embodiments, utilizing blocking symbols for at least some of the transmission starting points may mitigate mutual blocking during LBT procedures.

Embodiments of the present application may enable configuration of a ED with a pre-configured CG time resource including multiple transmission occasions. A transmission occasion within the pre-configured CG time resource may occur after one or more slots, mini-slots, or symbols, from the beginning of the pre-configured CG time resource or a previous transmission occasion.

When the pre-configured time resource has multiple transmission occasions this enables the ED to begin transmission at one of multiple locations within the pre-configured time resource. The term transmission occasion is intended to define a transmission starting point, not a particular duration of time within the CG time resource. Before the beginning of a first transmission occasion within the pre-configured CG time resource, the ED performs a first LBT procedure to access the channel at the transmission occasion. If the first LBT is successful, the ED can start transmission on the PUSCH at the first transmission occasion. However, if the LBT fails, the ED does not defer the channel access for the remaining pre-configured period as would happen with existing procedures. Instead of deferring to the next pre-configured time resource, the ED attempts another LBT before a second transmission occasion in the pre-configured CG time resource. If the LBT is unsuccessful in the second transmission occasion it attempts an LBT before a third transmission occasion. The ED continues attempting to perform an LBT until the LBT is successful or the ED exhausts all the transmission occasions in the current pre-configured CG time resource. If the ED is in unable to start transmission at any of the transmission occasions in the current pre-configured CG time resource, the ED can defer to transmission occasions in the next pre-configured GC time resource within the subsequent period.

NR-U supports wideband frequency domain operations. A wideband carrier can be divided into multiple subbands and groups of subbands can be grouped together as bandwidth parts (BWPs). Consequently, a configured grant capable ED can be configured with a wideband carrier that includes a wideband uplink (UL) bandwidth part (BWP) that spans multiple subbands of the wideband carrier. In some embodiments, each subband may be a 20 MHz unlicensed channel.

In order to increase the resiliency to LBT failure in NR-U and/or provide flexibility in resource allocation for different uplink traffic types of different quality of service (QoS) requirements, a configured grant capable ED can be configured with a frequency domain resource. In some embodiments, the frequency domain resource may be one or more frequency interlaces spanning one or more subbands, e.g., within a wideband UL BWP.

Before the configured grant capable ED can transmit over the configured grant time resource, the ED needs to perform LBT over the bandwidth of the configured grant frequency resources. The ED performs multiple subband LBT procedures. This may include following eLAA Type 1 or Type 2 multi-channel access.

Based on the results of the subband LBT procedures, the configured grant capable ED can transmit on one or more subbands for which the LBT procedure was successful. In some embodiments, the configured grant capable ED selects a number of subbands for which LBT procedure was successful based on the UL traffic type, e.g., TB size.

In some embodiments, this technique allows a group of configured grant capable EDs configured with the same time-frequency resources and with full channel BW (all interlaces) to transmit within the same configured grant period in a manner that mitigates blocking one another by transmitting on different subbands.

A base station can transmit configuration information to configure each configured grant capable ED in the group with a different primary subband when hierarchical multi-channel access is used over the wideband BWP. A time offset, configured by the base station or randomly selected by the configured grant capable ED, can be applied to the potential transmission starting position on secondary subbands to allow for opportunistic wideband CG transmissions.

In some embodiments, because the ED's power is divided across the transmission bandwidth, a configured grant capable ED that is configured for transmission over multiple subband frequency resources can choose to limit the configured grant transmission to a single subband for which LBT was successful within the wideband BWP for coverage extension. Such an event may occur for instance when the configured grant capable ED receives a series of consecutive step up transmit power control (TPC) commands from the base station. The ED may receive such TPC commands in a downlink feedback indication (DFI).

Figure 3:
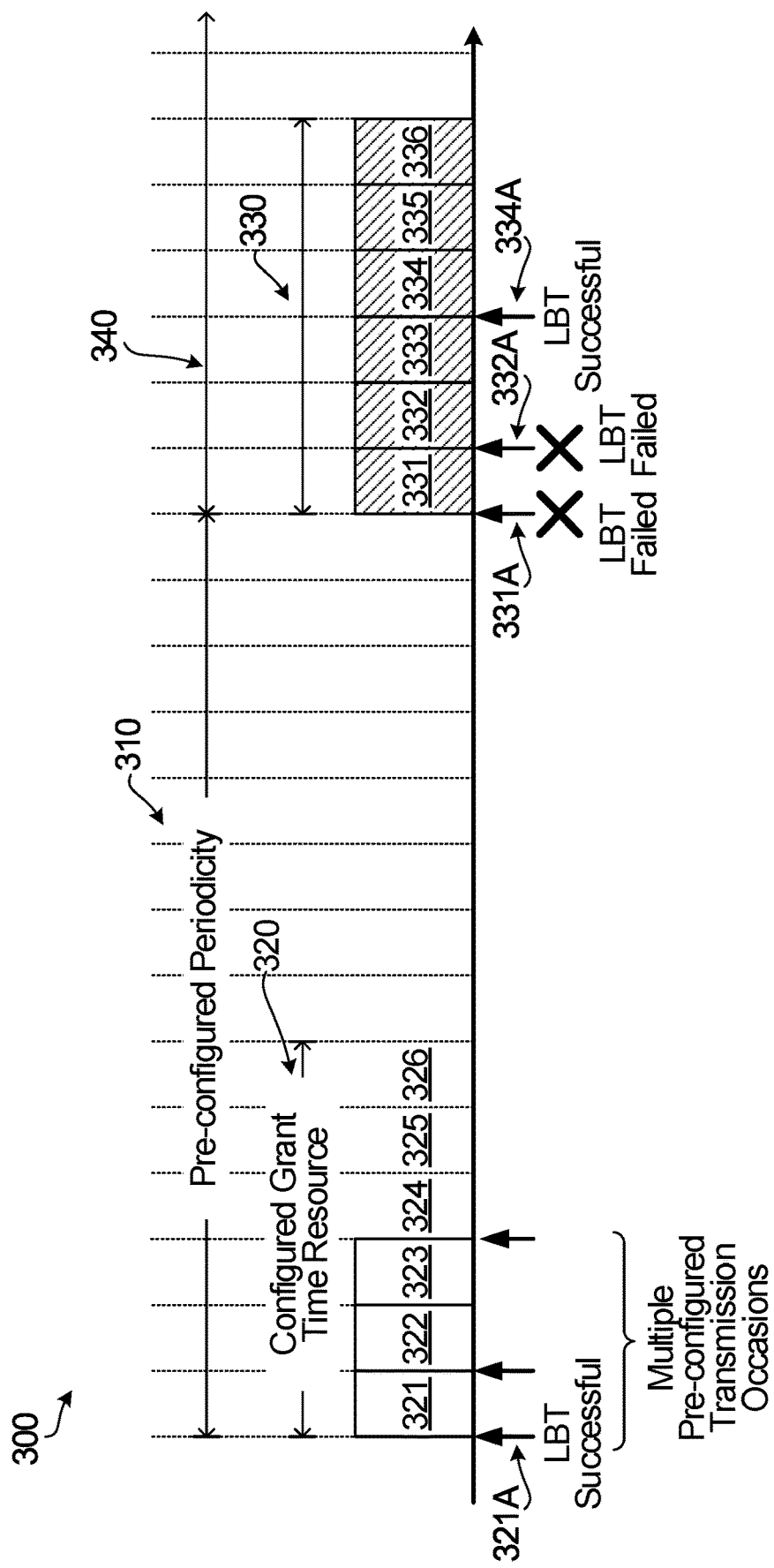
FIG. 3 is an example schematic diagram of two sequential periods of a time domain resource each having a transmit resource for configured grant in unlicensed spectrum according to an embodiment of the present application.

FIG. 3 illustrates an example of two successive pre-configured time resources for configured grant in unlicensed spectrum. A first pre-configured period 310 is shown that includes pre-configured CG time resource 320 includes six resource units 321-326. An example of a resource unit is a slot or a mini-slot. Three transmit occasions are preconfigured at the beginning of resource units 321, 322, and 324. An LBT is indicated to be successful at a first transmit occasion 321A that occurs at the beginning of resource unit 321 and the ED transmits from the transmit occasion 321A and occupies three resource units. The time domain resource outside of the pre-configured time resource 320, but within the first preconfigured period 310 is not used by the ED. A portion of a second pre-configured period 340 is shown that includes pre-configured CG time resource 330 having six resource units 331-336. An LBT is indicated to be unsuccessful at the beginning of the first two resource units 331 and 332 that correspond to first and second transmit occasions 33A and 332A. An LBT is indicated to be successful at the beginning of transmit occasion 334A and the ED then transmits at transmit occasions 334A and occupies the remainder of the preconfigured time resource. The time domain resource outside of the pre-configured time resource 330, but within the second preconfigured period 340 is not used by the ED. The resource units 321-326 and 331-336 may each be one or more slots, one or more mini-slots, or one or more symbols.

As indicated above for Type 1 and Type 2 NR CG procedures, the parameters K-repetitions and Periodicity are used to define time domain resource allocation for configured grant in licensed spectrum. In order to provide a consistent approach with existing Type 1 and Type 2 NR CG procedures, but enable a more effective and efficient result for NR-U CG, embodiments of the present application provide an alternative set of parameters in order to utilize configured grant in the unlicensed spectrum.

Figure 4:
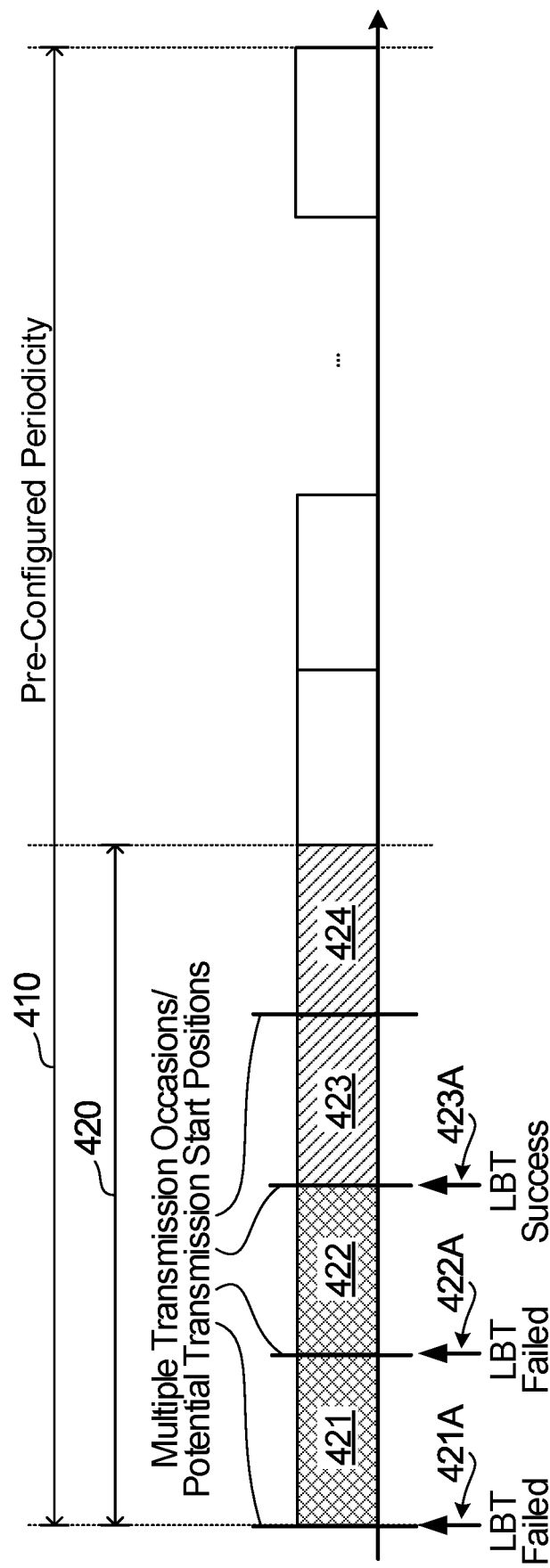
FIG. 4 is an example schematic diagram of a single period of a time domain resource having a transmit resource for configured grant in unlicensed spectrum according to an embodiment of the present application.

FIG. 4 illustrates an example of one period 410 of a transmission resource in unlicensed spectrum that can be configured to include a CG time resource 420 with multiple resource units 421, 422, 423 and 424 and transmit occasions indicated at 421A, 422A and 423A. The transmit resource units 421-424 may each be one or more slot, one or more mini-slot, or one or more symbol. The beginning of each of the transmission occasions 421A, 422A and 423A is identified as a potential transmission start position. The transmission may be a burst transmission. In FIG. 4, at the potential transmission start positions of the first and second resource units 421 and 422, LBT procedures are shown to have failed and thus there is no transmission at the first and second transmission occasions 421A and 422A. At the beginning of the third resource unit 423 the LBT procedure is shown to be successful. The ED then transmits in resource units 423 and 424. If the ED still has more to transmit the ED waits until a first transmission occasion in a next period. The remainder of the period of the transmission resource 400 is not used by the ED.

The K-repetitions parameter field used in NR CG Type 1 and Type 2 procedures for licensed spectrum can be replaced for NR-U CG with a parameter field that indicates the size of the configured grant time resource within the period of the transmission resource.

It should be understood that replacing the K-repetition parameter field may be an efficient way of introducing the new parameter field that indicates the size of the configured grant time resource within the period. However, if it is desirable to use the K-repetitions parameter field, e.g., for increased reliability for some applications in the unlicensed spectrum, the new parameter field may be added independently to the CG resource configuration parameters.

There are multiple ways in which the size of the configured grant time resource information can be provided. In a scenario in which there is a set of predefined configured grant resource sizes that could be used, an example of one way to provide the ED the configured grant resource information is to indicate an index of one of the predefined sizes. The size of the resource may be in units of one or more slots, one or more mini-slots or one or more symbols. The predefined configured grant resource sizes can be numerology dependent. In some embodiments, the sets may be grouped based on sizes in a same numerology value. In some embodiments, this may result in the sets being grouped based on subcarrier spacing.

An example of a second way to communicate the configured grant resource information to the ED is to indicate an absolute size of the configured grant resource. This may be done in units of milliseconds, i.e., subframes, or some other appropriate time scale such as slots or symbols.

The periodicity parameter field used in NR CG Type 1 and Type 2 procedures for licensed spectrum may be reused in the same form for NR-U CG. In some embodiments, one or both of the first two options that currently define the parameter for NR licensed, that is 2 OFDM symbols and 7 OFDM symbols, may not be defined as particular selections for NR-U CG periodicity.

Figure 5:
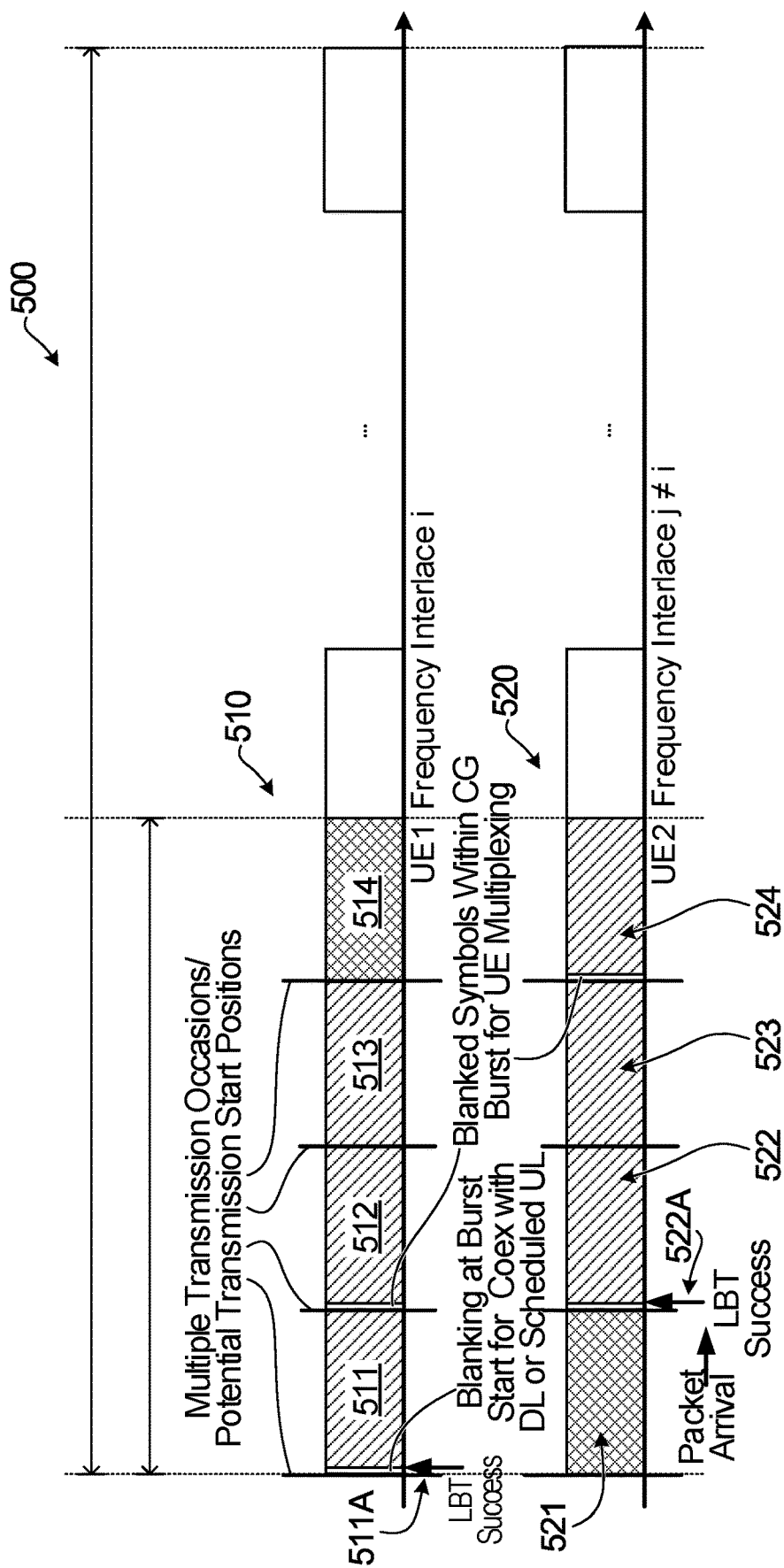
FIG. 5 is an example schematic diagram of a single period of a time domain resource for each of two user equipment (UE), each having a transmit resource for configured grant in unlicensed spectrum according to an embodiment of the present application.

FIG. 5 illustrates an example of one period 500 of a transmission resource in unlicensed spectrum that can be configured to include a CG time resource 510 with multiple resource units 511, 512, 513 and 514 for a first ED and a CG time resource 520 with multiple resource units 521, 522, 523 and 524 for a second ED. The resource units 511-514 may each be one or more slots, one or more mini-slots, or one or more symbols. The beginning of each of the resource units is identified as a potential transmission start position. In FIG. 5, at the beginning of the first resource unit 511, i.e. transmission occasion 511A, a LBT procedure is shown to be successful for the first ED. The ED then transmits in the first to fourth resource units 511, 512, 513 and 514. The first ED transmits using a first frequency domain interlace. No transmission occurs in the fourth transmission occasion 514. The remainder of the period of the transmission resource 500 for the first ED is not used.

The second ED does not transmit in the first resource unit 521 because there is no packet to transmit at the beginning of the resource unit. Upon the late arrival of the packet, the second ED performs a first LBT procedure at the start of the second resource unit 522, i.e. at transmission occasion 522A. The first LBT procedure is successful and so the second ED then transmits in the second, third and fourth resource unit 522, 523 and 524. The second ED transmits using a second frequency domain interlace. In the example of FIG. 5 the first and second frequency domain interlaces are indicated not to be the same. In some embodiments the interlaces can be orthogonal to one another.

In FIG. 5, the number of potential start positions could be equal to the number of resource units. In FIG. 5, this is shown to be four. However, it is to be understood that this is merely an example and that the number of transmission start positions resulting in a corresponding number of transmission occasions is not to be limited to four.

The timeDomainAllocation parameter field used in NR CG Type 1 and Type 2 procedures for licensed spectrum can be replaced for NR-U CG with a parameter field that indicates several features of the allocated CG time domain resource. The parameter field may include an indication of a number of start positions for a transmission within the CG time domain resource. The parameter field may also include one of 1) an indication of a number of blanking positions within the CG time domain resource or 2) an indication of a time interval between blanking positions from a beginning of the CG time domain resource. There might not be a blanking position at each start position of a transmission. In a particular example, when there are four transmission occasions in the CG time domain resource, blanking positions may be scheduled to occur at the beginning of the first and third transmission occasions, or at the beginning of the second and fourth transmission occasions. When the number of blanking positions is indicated, the parameter field may also include, for each of the blanking positions, one of 1) an indication of a starting point for the transmission at the blanking position or 2) an indication of a number of the blanking symbols from the blanking position.

With regard to identifying the starting point for each of the transmission start positions, in some embodiments the base station can configure each ED of a group of EDs with a same time domain resource configuration, but with frequency interlaces that are orthogonal to one another. In some embodiments, the base station can configure an ED to apply an offset at the beginning of a transmission to allow for coexistence with downlink or scheduled uplink or both. This offset may be a blanking duration that offsets the start position at the beginning of the CG resource to create room for LBT, after a downlink or scheduled uplink transmission ends, before the first transmission occasion of the CG time resource.

The timeDomainOffset parameter field used in NR CG Type 1 and Type 2 procedures for licensed spectrum may be reused in the same form for NR-U CG.

AUL-UCI in NR-U Design

In order to support Asynchronous HARQ in NR in licensed spectrum, procedures are being considered in which uplink control information (UCI) is transmitted on each physical uplink shared channel (PUSCH) in autonomous uplink (AUL) that carries ED-selected HARQ parameters. The contents of the UCI can also inform the base station of a PUSCH start point, PUSCH end point and possibly whether UL-to-DL MCOT sharing is possible. A slot in NR/NR-U contains 14 OFDM symbols (Oss). This is the same as the number of OS in a subframe in FeLAA AUL in which UCI has first been introduced. PUSCH typically spans all or a subset of the 14 OS in a slot. In AUL, the UE indicates the starting position and ending position of the PUSCH. The PUSCH start point may indicate that the starting position is OFDM symbol #0 or #1. The PUSCH end point may indicate that the ending position is OFDM symbol #12 or #13. In NR-U, it may be supported that a PUSCH spans multiple slots with starting and ending positions being still selected by the UE but options can be more than one symbol.

Embodiments of the present application provide using UCI for configured grant in unlicensed spectrum. The UCI can be modified to suit the Type 1 and Type 2 NR-U CG based design that has a scalable numerology.

For example, in some embodiments, a PUSCH start point parameter can be expanded to define a start point that includes one or more OFDM symbols. In other embodiments, a PUSCH start point parameter can indicate a starting OFDM symbol that is a fixed mapping to a number of OFDM symbols based on the numerology (or subcarrier spacing) assigned to the ED.

The PUSCH end point may be defined in a similar manner to that of the PUSCH start point. In some embodiments, the PUSCH end point can be expanded to define a start point that includes one or more OFDM symbols. In other embodiments, a PUSCH end point parameter can indicate an ending OFDM symbol that is a fixed mapping to a number of OFDM symbols based on the numerology (or subcarrier spacing) assigned to the ED.

The UCI may also include a parameter field to indicate a number of time domain resource units within the preconfigured time domain resource to be used by the PUSCH. The UCI may include the parameter field to support operation for a PUSCH that occurs across multiple time domain resource occasions.

In some embodiments, an ED selects a PUSCH start point and a PUSCH end point. The ED indicates these start and end points to the base station in the UCI. When a preconfigured blanking symbol location is scheduled at the beginning of a transmission resource occasion, to avoid overlap of the PUSCH with the blanking symbols, the start of the PUSCH needs to be scheduled subsequent to the blanking symbol locations. Therefore, the ED should be aware of the blanking symbol locations and avoid notifying the base station of a PUSCH start point or a PUSCH end point that would potentially overlap with the blanking symbol location.

Figure 6:
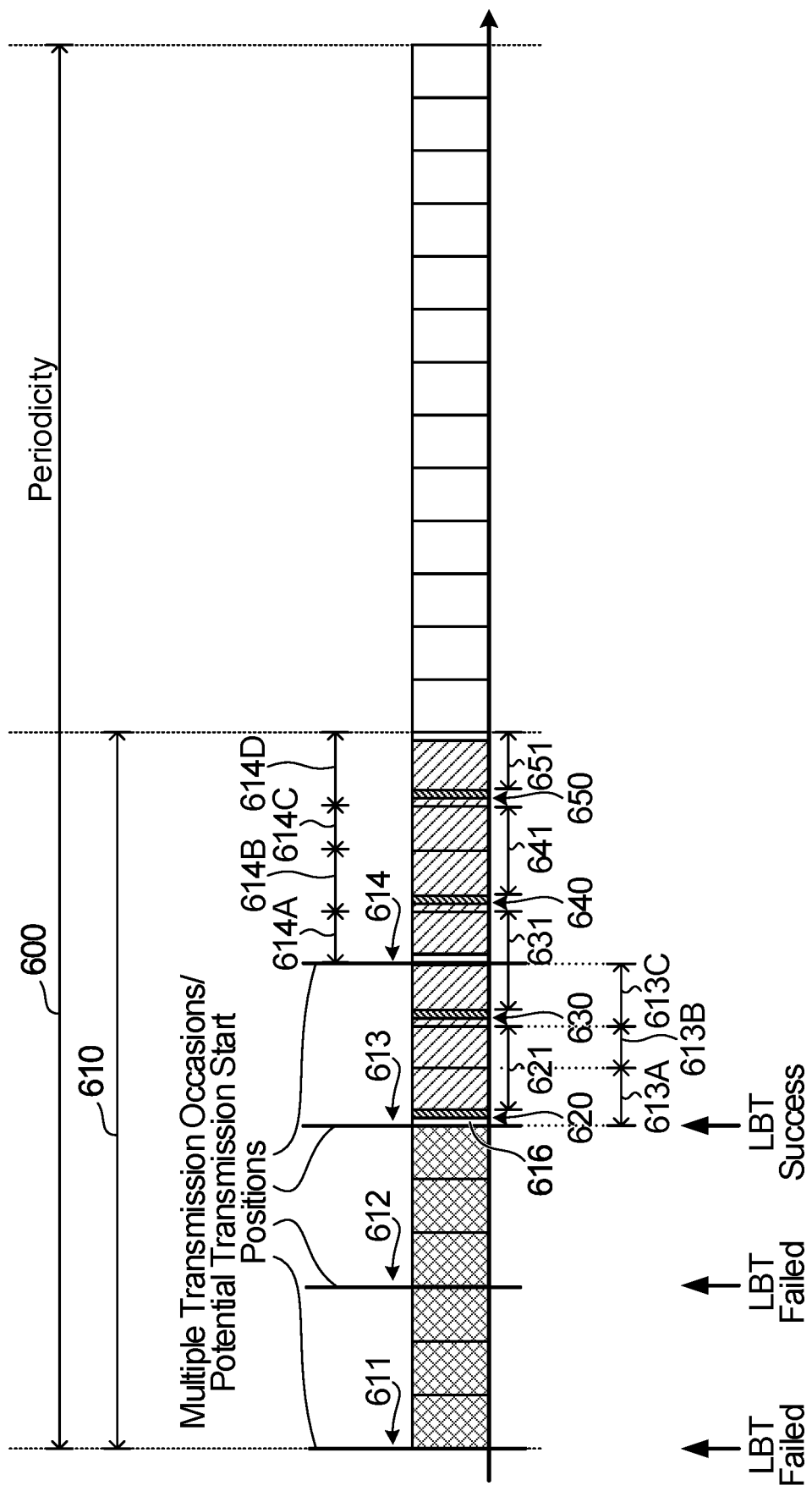
FIG. 6 is an example schematic diagram of a single period of a time domain resource having a transmit resource for configured grant in unlicensed spectrum in which uplink control information and corresponding physical uplink shared channels are transmitted according to an embodiment of the present application.

FIG. 6 illustrates an example of one period 600 of a transmission resource in unlicensed spectrum that can be configured to include a CG time resource 610 with multiple transmission occasions 611, 612, 613 and 614. The resource interval following transmission occasions 611, 612 and 613 is three slots and the resource interval following transmission occasion 614 is four slots. The beginning of each of the transmission occasions is identified as a potential transmission start position. In FIG. 6, at the first and second transmission occasions 611 and 612 it is shown that the LBT procedure has failed. At the third transmission occasion 613 the LBT procedure is shown to be successful. Following the successful LBT procedure, the ED sends a UCI 620 that indicates the start and end points for a first PUSCH 621. The UCI 620 also indicates that PUSCH 621 occupies two slots. The first PUSCH 621 occupies slots 613A and 613B.

Once the first PUSCH 621 is finished, the ED sends another UCI 630 for a second PUSCH 631. The UCI 630 indicates the start and end points for the second PUSCH 631. The UCI 630 also indicates that PUSCH 631 occupies two slots. The UCI 630 also indicates that the number of slots that the PUSCH 631 occupies is two slots. The second PUSCH 631 occupies slots 613C and 614A.

Once the second PUSCH 631 is finished, the ED sends another UCI 640 for a third PUSCH 641. The UCI 640 indicates the start and end points for the third PUSCH 641. The third PUSCH 641 occupies slots 614B and 614C.

Once the third PUSCH 641 is finished, the ED sends another UCI 650 for a fourth PUSCH 651. The UCI 650 indicates the start and end points for the fourth PUSCH 651. The UCI 640 also indicates that PUSCH 641 occupies the remainder of this last slot.

The example of FIG. 6 illustrates that there are four transmission occasions 611, 612, 613 and 614. This is not intended to be a limiting example. In some embodiments, the interval between each transmission occasion may be a considered single slot. In some embodiments, the interval between each transmission occasion may be considered a slot with multiple mini-slots. In some embodiments, the interval between each transmission occasion may be considered a single mini-slot. In some embodiments, the interval between each transmission occasion may be considered a mini-slot with multiple symbols.

Figure 7:
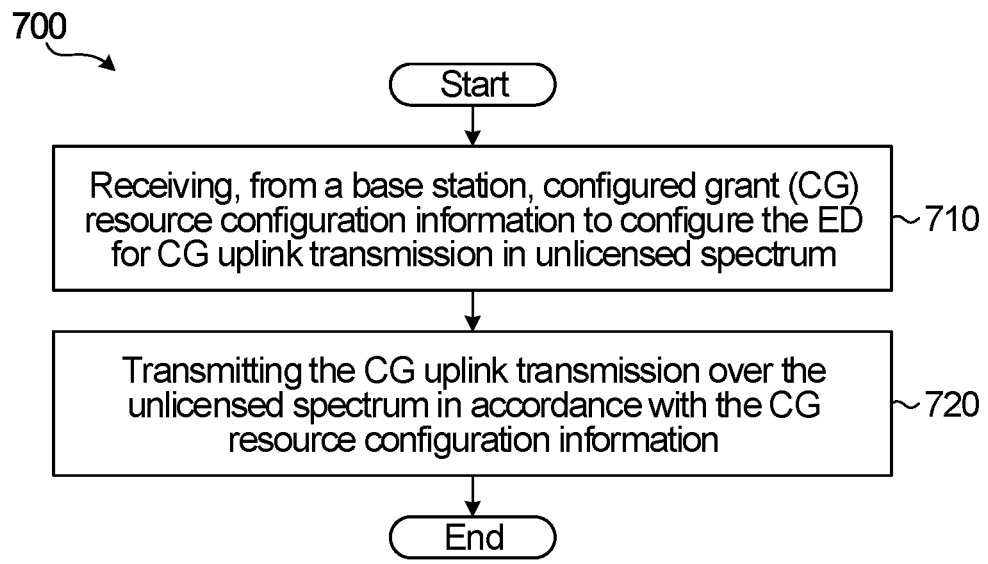
FIG. 7 is a flow diagram of example operations in an ED in accordance with an embodiment of the present disclosure.

FIG. 7 is a flow diagram of example operations 700 performed in an electronic device (ED) in accordance with an embodiment of the present disclosure In step 710, the ED receives, from a base station, configured grant (CG) resource configuration information to configure the ED for CG uplink transmission in unlicensed spectrum. The CG resource configuration information includes an indication of a CG time domain resource duration within a period of a transmission resource. The CG resource configuration information includes an indication of a periodicity of the CG time domain resource. The CG resource configuration information may include time domain resource allocation information. The time domain resource allocation information identifies multiple occasions for the ED to start a CG uplink transmission within the CG time domain resource duration upon a successful listen-before-talk (LBT) procedure.

In some embodiments, the indication of the CG time domain resource duration is an indication of a size of the CG time domain resource within the period containing the CG time domain resource.

In some embodiments, the indication of the size of the CG time domain resource is an index associated with a size of a CG time domain resource selected from a set of sizes of CG time domain resources. In some embodiments, the indication of the size of the CG time domain resource is an indication of an absolute size of the CG time domain resource.

In some embodiments, the time domain resource allocation information includes an indication of a number of start positions for a transmission within the CG time domain resource. In some embodiments, the time domain resource allocation information includes one of 1) an indication of a number of blanking positions within the CG time domain resource or 2) an indication of a time interval between blanking positions from a beginning of the CG time domain resource. For each of the blanking positions, the time domain resource allocation information may include one of 1) an indication of a starting point for the transmission at the blanking position or 2) an indication of a number of blanking symbols from the blanking position.

In some embodiments, the CG resource configuration information is selected such that a transmission starting positon of the ED and a transmission starting positon of other EDs are aligned to allow frequency multiplexing of the ED and other EDs configured to use orthogonal frequency interlaces.

In some embodiments, the CG resource configuration information is selected to align a blanking position at a beginning of a transmission start position for the ED to mitigate mutual blocking between the ED and other EDs during LBT procedures performed by the other EDs.

In step 720, the ED transmits the CG uplink transmission over the unlicensed spectrum in accordance with the CG resource configuration information.

In some embodiments, all the CG resource configuration information is received in RRC signaling.

In some embodiments, the indication of the CG time domain resource duration and the indication of the periodicity of the CG time domain resource are received in radio resource control (RRC) signaling and the time domain resource allocation information is received in downlink control information (DCI) signaling.

The example operations 700 are illustrative of an example embodiment. Various ways to perform the illustrated operations, as well as examples of other operations that may be performed, are described herein. Further variations may be or become apparent.

Figure 8:
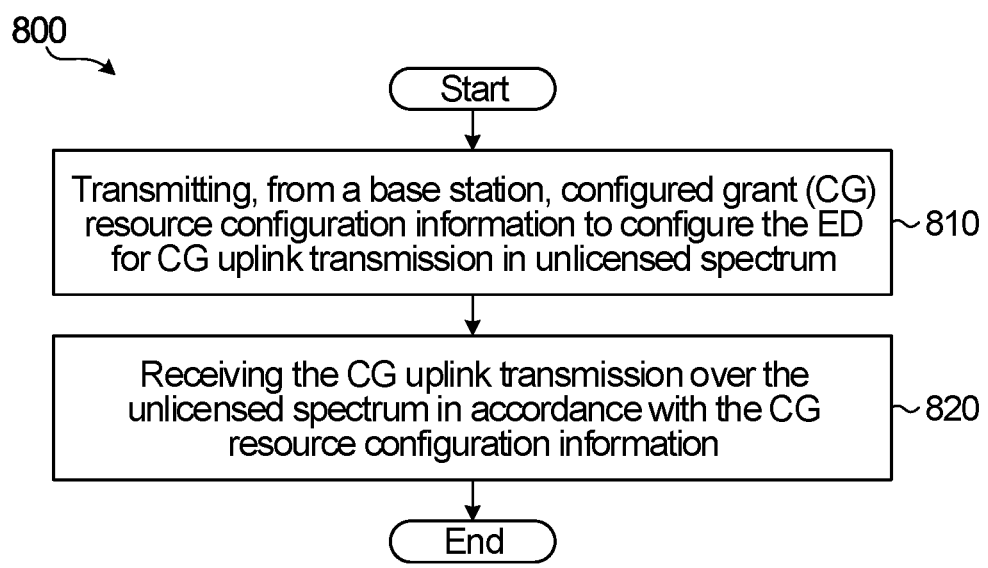
FIG. 8 is a flow diagram of examples operations in a base station in accordance with an embodiment of the present disclosure.

FIG. 8 is a flow diagram of example operations 800 performed in a base station in accordance with an embodiment of the present disclosure.

In step 810, the base station transmits, to an electronic device (ED), configured grant (CG) resource configuration information to configure the ED for CG uplink transmission in unlicensed spectrum. The CG resource configuration information includes an indication of a CG time domain resource duration within a period of a transmission resource. The CG resource configuration information includes an indication of a periodicity of the CG time domain resource. The CG resource configuration information may include time domain resource allocation information. The time domain resource allocation information identifies multiple occasions for the ED to start a CG uplink transmission within the CG time domain resource duration upon a successful listen-before-talk (LBT) procedure. In step 820, the base station receives the CG uplink transmission over the unlicensed spectrum in accordance with the CG resource configuration information.

The example operations 800 are illustrative of an example embodiment. Various ways to perform the illustrated operations, as well as examples of other operations that may be performed, are described herein. Further variations may be or become apparent.

Figure 9:
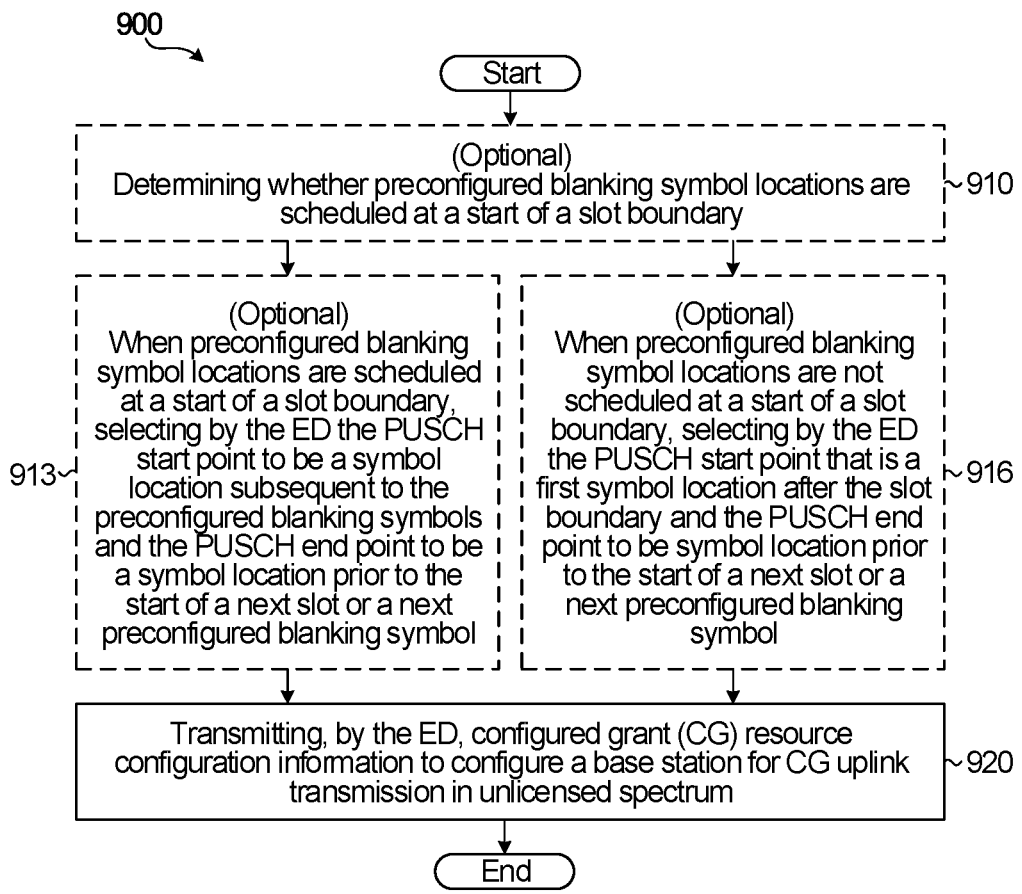
FIG. 9 is a flow diagram of example operations in an ED in accordance with an embodiment of the present disclosure.

FIG. 9 is a flow diagram of example operations 900 performed in an ED in accordance with an embodiment of the present disclosure.

Step 910 is an optional step that involves, determining whether preconfigured blanking symbol locations are scheduled at a start of a slot boundary. In a further optional step, when preconfigured blanking symbol locations are determined to be scheduled at a start of a slot boundary, step 913 involves selecting by the ED the PUSCH start point to be a symbol location subsequent to the preconfigured blanking symbols and the PUSCH end point to be a symbol location prior to the start of a next slot or a next preconfigured blanking symbol. In a further optional step, when preconfigured blanking symbol locations are determined not to be scheduled at a start of a slot boundary, step 916 involves selecting by the ED the PUSCH start point that is a first symbol location after the slot boundary and the PUSCH end point to be symbol location prior to the start of a next slot or a next preconfigured blanking symbol.

Step 920 involves transmitting, by the ED, configured grant (CG) resource configuration information to configure a base station for CG uplink transmission in unlicensed spectrum. The CG resource configuration information includes, for each physical uplink shared channel (PUSCH) being transmitted, uplink control information (UCI) that includes an indication of a PUSCH start point, an indication of a PUSCH end point and an indication of a PUSCH duration, e.g. a number of slots in the PUSCH.

In some embodiments, the indication of the PUSCH start point comprises at least one of 1) an indication of the PUSCH start point that is one or more orthogonal frequency domain multiplexed (OFDM) symbols and 2) an indication of the PUSCH start point that is a fixed mapping to a number of OFDM symbols based on subcarrier spacing configuration.

The example operations 900 are illustrative of an example embodiment. Various ways to perform the illustrated operations, as well as examples of other operations that may be performed, are described herein. Further variations may be or become apparent.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding EDs and base stations are known to those of skill in the art. As such, these details are omitted here for clarity.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in the other figures are also intended solely for illustrative purposes.

Other implementation details could also vary between different embodiments. For example, some of the examples above refer to NR and LTE terminology. However, the embodiments disclosed herein are not in any way limited to NR or LTE systems.

In addition, although described primarily in the context of methods and systems, other implementations are also contemplated, as instructions stored on a non-transitory processor-readable medium, for example. The instructions, when executed by one or more processors, cause the one or more processors to perform a method.

According to a first example, there is provided a method for an electronic device (ED) in a wireless communication network, the method involves receiving, at the ED from a base station, configured grant (CG) resource configuration information to configure the ED for CG uplink transmission in unlicensed spectrum, the CG resource configuration information includes: an indication of a CG time domain resource duration within a period of a transmission resource; an indication of a periodicity of the CG time domain resource; and time domain resource allocation information, wherein the time domain resource allocation information identifies multiple occasions for the ED to start a CG uplink transmission within the CG time domain resource duration upon a successful listen-before-talk (LBT) procedure; and transmitting the CG uplink transmission over the unlicensed spectrum in accordance with the CG resource configuration information.

According to a first embodiment of the first example, the indication of the CG time domain resource duration comprises an indication of a size of the CG time domain resource within the period containing the CG time domain resource.

According to a second embodiment of the first example, the indication of the size of the CG time domain resource is one of: an index associated with a size of a CG time domain resource selected from a set of sizes of CG time domain resources; or an indication of an absolute size of the CG time domain resource.

According to a third embodiment of the first example, the time domain resource allocation information includes: an indication of a number of start positions for a transmission within the CG time domain resource; one of: an indication of a number of blanking positions within the CG time domain resource; or an indication of a time interval between blanking positions from a beginning of the CG time domain resource; and for each of the blanking positions, one of: an indication of a starting point for the transmission at the blanking position; or an indication of a number of blanking symbols from the blanking position.

According to a fourth embodiment of the first example, all the CG resource configuration information is received in radio resource control (RRC) signaling.

According to a fifth embodiment of the first example, the indication of the CG time domain resource duration and the indication of the periodicity of the CG time domain resource are received in radio resource control (RRC) signaling and the time domain resource allocation information is received in downlink control information (DCI) signaling.

According to a sixth embodiment of the first example, the CG resource configuration information is selected to align a blanking position at a beginning of a transmission start position for the ED to mitigate mutual blocking between the ED and other EDs during LBT procedures performed by the other EDs.

According to a seventh embodiment of the first example, the method further involves selecting the CG resource configuration information to align a transmission starting positon of the ED with a transmission starting positon of other EDs to allow frequency multiplexing of the ED and other EDs configured to use orthogonal frequency interlaces.

According to a eighth embodiment of the first example, the method further involves the ED receiving an indication of a frequency domain resource comprising an identification of a plurality of subbands within a wideband carrier and one or more frequency interlaces that are configured for the CG uplink transmission in the unlicensed spectrum; and the ED performing the LBT procedure for at least one of the plurality of subbands.

According to a ninth embodiment of the first example, the number of subbands in the plurality of subbands is based on one of a traffic type of the transmission or a transmission block (TB) size of the transmission.

According to a tenth embodiment of the first example, the method further involves the ED receiving an indication of one or more frequency interlaces per subband for the plurality of subbands for the CG uplink transmission in the unlicensed spectrum, wherein the one or more frequency interlaces per subband configured for the ED are different than one or more frequency interlaces per subband configured for other EDs that the base station serves.

According to a second example, there is provided a method for a base station in a wireless communication network, the method involves: transmitting, by the base station to an electronic device (ED), configured grant (CG) resource configuration information to configure the ED for CG uplink transmission in unlicensed spectrum, the CG resource configuration information includes: an indication of a CG time domain resource duration within a period of a transmission resource; an indication of a periodicity of the CG time domain resource; and time domain resource allocation information, wherein the time domain resource allocation information identifies multiple occasions for the UE to start a CG uplink transmission within the CG time domain resource duration upon a successful listen-before-talk (LBT) procedure; and receiving the CG uplink transmission over the unlicensed spectrum in accordance with the CG resource configuration information.

According to a first embodiment of the second example, the indication of the CG time domain resource duration includes an indication of a size of the CG time domain resource within a period containing the CG time domain resource.

According to a second embodiment of the second example, the indication of the size of the CG time domain resource is one of: an index associated with a size of a CG time domain resource selected from a set of sizes of CG time domain resources; or an indication of an absolute size of the CG time domain resource.

According to a third embodiment of the second example, the time domain allocation information includes: an indication of a number of start positions for data transmission within the CG time domain resource; one of: an indication of a number of blanking positions within the CG time domain resource; or an indication of a time interval between blanking positions from a beginning of the CG time domain resource; and for each of the blanking positions, one of: an indication of a starting point for the transmission at the blanking position; or an indication of a number of blanking symbols from the blanking position.

According to a fourth embodiment of the second example, all the CG resource configuration information is transmitted in radio resource control (RRC) signaling.

According to a fifth embodiment of the second example, the indication of the CG time domain resource duration and the indication of the periodicity of the CG time domain resource are transmitted in radio resource control (RRC) signaling and the time domain resource allocation information is received in downlink control information (DCI) signaling.

According to a sixth embodiment of the second example, the CG resource configuration information is selected to align a blanking position at a beginning of a transmission start position for the ED to mitigate mutual blocking between the ED and other EDs during LBT procedures performed by the other EDs.

According to a seventh embodiment of the second example, selecting the CG resource configuration information to align a transmission starting positon of the ED with a transmission starting positon of other EDs to allow frequency multiplexing of the ED and other EDs configured to use orthogonal frequency interlaces.

According to an eighth embodiment of the second example, the method further involves the base station transmitting an indication of a frequency domain resource including an identification of a plurality of subbands within a wideband carrier and one or more frequency interlaces that are configured for the CG uplink transmission in the unlicensed spectrum.

According to a ninth embodiment of the second example, the method further involves the base station transmitting an indication of one or more frequency interlaces per subband for the plurality of subbands for the CG uplink transmission in the unlicensed spectrum for each ED served by the base station, wherein the one or more frequency interlaces per subband configured for each ED are different than other EDs.

According to a third example, there is provided a method for an electronic device (ED) in a wireless communication network, the method involving: transmitting, by the ED, configured grant (CG) resource configuration information to configure a base station for CG uplink transmission in unlicensed spectrum, the CG resource configuration information including, for each physical uplink shared channel (PUSCH) being transmitted, uplink control information (UCI) that includes an indication of a PUSCH start point, an indication of a PUSCH end point and an indication of a PUSCH duration, e.g. a number of slots in the PUSCH.

According to a first embodiment of the third example, the indication of the PUSCH start point comprises at least one of: an indication of the PUSCH start point that is one or more orthogonal frequency domain multiplexed (OFDM) symbols; and an indication of the PUSCH start point that is a fixed mapping to a number of OFDM symbols based on subcarrier spacing configuration.

According to a second embodiment of the third example, the method further involves when preconfigured blanking symbol locations overlap with symbol locations preceding the PUSCH start point from the end of the last slot boundary or symbol locations following the PUSCH end point to the start point of a next slot boundary, selecting by the UE the PUSCH start point to be a symbol location subsequent to the preconfigured blanking symbols and the PUSCH end point to be a symbol location prior to the start of a next slot or a next preconfigured blanking symbol.

According to a fourth example, there is provided a method in a wireless communication network, the method involving: receiving, by a base station from an electronic device (ED), configured grant (CG) resource configuration information to configure the base station for CG uplink transmission in unlicensed spectrum, the CG resource configuration information comprising, for each physical uplink shared channel (PUSCH) being transmitted, uplink control information (UCI) that includes an indication of a PUSCH start point, an indication of a PUSCH end point and an indication of a PUSCH duration, e.g. a number of slots in the PUSCH.

According to a first embodiment of the fourth example, the indication of the PUSCH start point comprises at least one of: an indication of the PUSCH start point that is one or more orthogonal frequency domain multiplexed (OFDM) symbols; and an indication of the PUSCH start point that is a fixed mapping to a number of OFDM symbols based on subcarrier spacing configuration.

According to a second embodiment of the fourth example, the method further involves receiving an indication of the selected PUSCH start point and the selected PUSCH end point, wherein the PUSCH start point is a symbol location subsequent to the preconfigured blanking symbols and the PUSCH end point is a symbol location prior to the start of a next slot or a next preconfigured blanking symbol.

According to a fifth example, there is provided an apparatus including a processor and a processor readable storage device. The processor readable storage device has stored thereon, processor executable instructions that when executed by the processor cause the processor to execute a method according to any one of the embodiments of the first example described above.

According to a first embodiment of the fifth example, the apparatus is an electronic device (ED).

According to a sixth example, there is provided an apparatus including a processor and a processor readable storage device. The processor readable storage device has stored thereon, processor executable instructions that when executed by the processor cause the processor to execute a method according to any one of the embodiments of the second example described above.

According to a first embodiment of the sixth example, the apparatus is an electronic device (ED).

According to a seventh example, there is provided an apparatus including a processor and a processor readable storage device. The processor readable storage device has stored thereon, processor executable instructions that when executed by the processor cause the processor to execute a method according to any one of the embodiments of the third example described above.

According to a first embodiment of the seventh example, the apparatus is a base station.

According to a eighth example, there is provided an apparatus including a processor and a processor readable storage device. The processor readable storage device has stored thereon, processor executable instructions that when executed by the processor cause the processor to execute a method according to any one of the embodiments of the fourth example described above.

According to a first embodiment of the eighth example, the apparatus is a base station. The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for an electronic device (ED) in a wireless communication network, the method comprising:
   receiving, at the ED from a base station, configured grant (CG) resource configuration information to configure the ED for a CG uplink transmission in unlicensed spectrum, the CG resource configuration information comprising:
      an indication of a CG time domain resource duration within a period of a CG time domain resource, wherein the indication of the CG time domain resource duration within the period is independent of an indication of a number of repetitions of a single transmit block within the period;
      CG time domain resource allocation information identifying multiple occasions for the ED to start the CG uplink transmission within the CG time domain resource duration upon a successful listen-before-talk (LBT) procedure; and
      an indication of a periodicity of the CG time domain resource; and
   transmitting the CG uplink transmission over the unlicensed spectrum in accordance with the CG resource configuration information.

2. The method of claim 1, wherein the indication of the CG time domain resource duration comprises an indication of a size of the CG time domain resource within the period containing the CG time domain resource.

3. The method of claim 2, wherein the indication of the size of the CG time domain resource is one of:
   an index associated with a size of a CG time domain resource selected from a set of sizes of CG time domain resources; or
   an indication of a size of the CG time domain resource in units of subframes, slots, or symbols.

4. The method of claim 1, wherein the CG resource configuration information comprises an indication of a number of start positions for a transmission within the CG time domain resource.

5. The method of claim 1, wherein all the CG resource configuration information is received in radio resource control (RRC) signaling.

6. The method of claim 1, wherein the CG resource configuration information is received in part in radio resource control (RRC) signaling and in part in downlink control information (DCI) signaling.

7. The method of claim 1, further comprising:
   receiving, by the ED, an indication of a frequency domain resource comprising an identification of a plurality of subbands within a wideband carrier and one or more frequency interlaces that are configured for the CG uplink transmission in the unlicensed spectrum; and
   performing, by the ED, a listen-before-talk (LBT) procedure for at least one of the plurality of subbands.

8. The method of claim 1, wherein the ED is further configured with one or more hybrid automatic repeat request (HARQ) process IDs, and wherein transmitting the CG uplink transmission over the unlicensed spectrum in accordance with the CG resource configuration information comprises transmitting consecutive physical uplink shared channels (PUSCHs) in the indicated CG time domain resource duration within the period, each PUSCH including uplink control information (UCI) indicating at least HARQ parameters selected by the ED including a HARQ process ID.

9. A method for a base station in a wireless communication network, the method comprising:
   transmitting, by the base station, configured grant (CG) resource configuration information to an electronic device (ED) to configure the ED fora CG uplink transmission in unlicensed spectrum, the CG resource configuration information comprising:
      an indication of a CG time domain resource duration within a period of a CG time domain resource, wherein the indication of the CG time domain resource duration within the period is independent of an indication of a number of repetitions of a single transmit block within the period;
      CG time domain resource allocation information identifying multiple occasions for the ED to start the CG uplink transmission within the CG time domain resource duration upon a successful listen-before-talk (LBT) procedure; and
      an indication of a periodicity of the CG time domain resource; and
   receiving, by the base station, the CG uplink transmission over the unlicensed spectrum in accordance with the CG resource configuration information.

10. The method of claim 9, wherein the indication of the CG time domain resource duration comprises an indication of a size of the CG time domain resource within the period containing the CG time domain resource.

11. The method of claim 10, wherein the indication of the size of the CG time domain resource is one of:
- an index associated with a size of a CG time domain resource selected from a set of sizes of CG time domain resources; or
- an indication of a size of the CG time domain resource in units of subframes, slots, or symbols.

12. The method of claim 9, wherein the CG resource configuration information comprises an indication of a number of start positions for a transmission within the CG time domain resource.

13. The method of claim 9, wherein all the CG resource configuration information is received in radio resource control (RRC) signaling.

14. The method of claim 9, wherein the CG resource configuration information is received in part in radio resource control (RRC) signaling and in part in downlink control information (DCI) signaling.

15. The method of claim 9, further comprising:
- transmitting, by the base station, an indication of a frequency domain resource to the ED, the indication comprising an identification of a plurality of subbands within a wideband carrier and one or more frequency interlaces that are configured for the CG uplink transmission in the unlicensed spectrum.

16. The method of claim 9, further comprising:
- selecting, by the base station, the CG resource configuration information to align a transmission starting position of the ED with a transmission starting position of other EDs to allow frequency multiplexing of the ED and other EDs configured to use different frequency interlaces.

17. The method of claim 9, wherein the ED is further configured with one or more hybrid automatic repeat request (HARQ) process IDs, and wherein receiving the CG uplink transmission over the unlicensed spectrum in accordance with the CG resource configuration information comprises receiving consecutive physical uplink shared channels (PUSCHs) in the indicated CG time domain resource duration within the period, each PUSCH including uplink control information (UCI) indicating at least HARQ parameters selected by the ED including a HARQ process ID.

18. An electronic device (ED) comprising:
- a processor; and
- a non-transitory computer readable storage medium storing programming for execution by the processor, the programming including instructions to:
- receive configured grant (CG) resource configuration information from a base station to configure the ED for a CG uplink transmission in unlicensed spectrum, the CG resource configuration information comprising:
  - an indication of a CG time domain resource duration within a period of a CG time domain resource, wherein the indication of the CG time domain resource duration within the period is independent of an indication of a number of repetitions of a single transmit block within the period;
  - CG time domain resource allocation information identifying multiple occasions for the ED to start the CG uplink transmission within the CG time domain resource duration upon a successful listen-before-talk (LBT) procedure; and
  - an indication of a periodicity of the CG time domain resource; and
- transmit the CG uplink transmission over the unlicensed spectrum in accordance with the CG resource configuration information.

19. The ED of claim 18, wherein the indication of the CG time domain resource duration comprises an indication of a size of the CG time domain resource within the period containing the CG time domain resource.

20. The ED of claim 19, wherein the indication of the size of the CG time domain resource is one of:
- an index associated with a size of a CG time domain resource selected from a set of sizes of CG time domain resources; or
- an indication of a size of the CG time domain resource in units of subframes, slots, or symbols.

21. The ED of claim 18, wherein the ED is further configured with one or more hybrid automatic repeat request (HARQ) process IDs, and wherein transmitting the CG uplink transmission over the unlicensed spectrum in accordance with the CG resource configuration information comprises transmitting consecutive physical uplink shared channels (PUSCHs) in the indicated CG time domain resource duration within the period, each PUSCH including uplink control information (UCI) indicating at least HARQ parameters selected by the ED including a HARQ process ID.

22. A base station comprising:
- a processor; and
- a non-transitory computer readable storage medium storing programming for execution by the processor, the programming including instructions to:
- transmit configured grant (CG) resource configuration information to an electronic device (ED) to configure the ED for a CG uplink transmission in unlicensed spectrum, the CG resource configuration information comprising:
  - an indication of a CG time domain resource duration within a period of a CG time domain resource, wherein the indication of the CG time domain resource duration within the period is independent of an indication of a number of repetitions of a single transmit block within the period;
  - CG time domain resource allocation information identifying multiple occasions for the ED to start the CG uplink transmission within the CG time domain resource duration upon a successful listen-before-talk (LBT) procedure; and
  - an indication of a periodicity of the CG time domain resource; and
- receive the CG uplink transmission over the unlicensed spectrum in accordance with the CG resource configuration information.

23. The base station of claim 22, wherein the indication of the CG time domain resource duration comprises an indication of a size of the CG time domain resource within the period containing the CG time domain resource.

24. The base station of claim 23, wherein the indication of the size of the CG time domain resource is one of:
- an index associated with a size of a CG time domain resource selected from a set of sizes of CG time domain resources; or
- an indication of a size of the CG time domain resource in units of subframes, slots, or symbols.

25. The base station of claim 22, wherein the programming further includes instructions to:
- select the CG resource configuration information to align a transmission starting position of the ED with a transmission starting position of other EDs to allow frequency multiplexing of the ED and other EDs configured to use different frequency interlaces.

26. The base station of claim 22, wherein the ED is further configured with one or more hybrid automatic repeat request (HARQ) process IDs, and wherein receiving the CG uplink transmission over the unlicensed spectrum in accordance with the CG resource configuration information comprises receiving consecutive physical uplink shared channels (PUSCHs) in the indicated CG time domain resource duration within the period, each PUSCH including uplink control information (UCI) indicating at least HARQ parameters selected by the ED including a HARQ process ID.

\* \* \* \* \*